US007807282B2

(12) United States Patent
Hamada et al.

(10) Patent No.: US 7,807,282 B2
(45) Date of Patent: Oct. 5, 2010

(54) NICKEL-METAL HYDRIDE STORAGE BATTERY

(75) Inventors: Shinji Hamada, Toyohashi (JP); Tomohiro Matsuura, Toyota (JP); Toyohiko Eto, Toyota (JP); Hiroyuki Miyamoto, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 767 days.

(21) Appl. No.: 11/630,329

(22) PCT Filed: Jun. 29, 2005

(86) PCT No.: PCT/JP2005/012443

§ 371 (c)(1),
(2), (4) Date: Dec. 21, 2006

(87) PCT Pub. No.: WO2006/004143

PCT Pub. Date: Jan. 12, 2006

(65) Prior Publication Data

US 2008/0020268 A1     Jan. 24, 2008

(30) Foreign Application Priority Data

Jul. 2, 2004     (JP)     ............... 2004-196821

(51) Int. Cl.
    *H01M 2/12* (2006.01)
(52) U.S. Cl. .......................................... 429/54; 429/86
(58) Field of Classification Search .................. 429/53, 429/54, 55, 86
    See application file for complete search history.

(56) References Cited

U.S. PATENT DOCUMENTS 5,455,128 A * 10/1995 Tanaka ..................... 429/53 X (Continued)

FOREIGN PATENT DOCUMENTS

EP     0 692 829     1/1996

(Continued)

OTHER PUBLICATIONS

Supplementary European Search Report dated Sep. 18, 2008.

(Continued)

*Primary Examiner*—Stephen J. Kalafut
(74) *Attorney, Agent, or Firm*—Finnegan, Henderson, Farabow, Garrett & Dunner, LLP

(57) ABSTRACT

A nickel-metal hydride storage battery is provided capable of suppressing an increase of discharge reserve of a negative electrode and preventing lowering of battery characteristics. A nickel-metal hydride storage battery 100 of the present invention comprises a battery main part (an electrode plate group 150, an electrolyte, and others), a case 102 housing this battery main part, and a safety valve device 101 having an excessive pressure preventing function for preventing excessive rise of the internal pressure in the case 102 by discharging gas from the case 102 when the internal pressure in the case 102 exceeds a predetermined value. The safety valve device 101 includes a valve member 110 having a protruding wall 118 forming a valve internal space C communicated with a release hole 122 and has a hydrogen leakage function for allowing leakage of hydrogen gas in the case 102 out of the battery through the valve internal space C even when the internal pressure in the case 102 is the predetermined value or less.

5 Claims, 25 Drawing Sheets

U.S. PATENT DOCUMENTS

| | | |
|---|---|---|
| 5,472,802 A * | 12/1995 | Holland et al. ............... 429/54 |
| 6,022,635 A | 2/2000 | O'Hara, III |
| 2003/0022061 A1 | 1/2003 | Duprey et al. |

FOREIGN PATENT DOCUMENTS

| | | |
|---|---|---|
| JP | 58-162564 | 10/1983 |
| JP | 02-288064 | 11/1990 |
| JP | 05-325930 | 12/1993 |
| JP | 8-148135 | 6/1996 |
| JP | 1996-25570 | 7/1996 |
| JP | 2003-059462 | 2/2003 |
| JP | 2003-297325 | 10/2003 |
| JP | 2004-185809 | 7/2004 |
| KR | 218369 | 7/1996 |
| KR | 1997-0004141 | 3/1997 |
| WO | WO93/06628 | 4/1993 |
| WO | WO 02/59990 | 8/2002 |

OTHER PUBLICATIONS

Korean Office Action dated Apr. 8, 2008.
International Search Report oct. 18, 2005.

* cited by examiner

NICKEL-METAL HYDRIDE STORAGE BATTERY

TECHNICAL FIELD

The present invention relates to a nickel-metal hydride storage battery.

BACKGROUND ART

In recent years, various types of nickel-metal hydride storage batteries have been proposed as power sources for portable devices or equipment or power sources for electric vehicles or hybrid electric vehicles (refer to Patent document 1 and Patent document 2, for example).

Patent document 1: Japanese unexamined patent publication No. 8-148135(1996)

Patent document 2: Japanese unexamined patent publication No. 5-325930(1993)

The nickel-metal hydride storage battery is normally designed to have a negative electrode capacity larger than a positive electrode capacity. Accordingly, the discharge capacity of the battery is regulated by the positive electrode capacity (hereinafter, referred to as a "positive electrode capacity regulation"). This positive electrode regulation makes it possible to suppress an increase in internal pressure during overcharging or overdischarging. It is to be noted that an excess capacity of a negative electrode available for charge is referred to as charge reserve and an excess capacity of the negative electrode available for discharge is referred to as discharge reserve.

DISCLOSURE OF INVENTION

Problems to be Solved by the Invention

Meanwhile, in the nickel-metal hydride storage battery, the hydrogen absorbing alloy of a negative electrode tends to corrode due to repeated use, causing a side reaction that the hydride absorbing alloy will absorb hydrogen. In the nickel-metal hydride storage battery, particularly including a metal case, accordingly, the hydrogen absorption amount of the hydrogen absorbing alloy gradually increases. As a result, the discharge reserve of the negative electrode increases while the charge reserve decreases, leading to a rise in the internal pressure in the battery during charging. Further, a battery capacity decreases with an increase in the discharge reserve. When used in the hybrid electric vehicles or others, such battery may cause a decrease in fuel efficiency or other problems.

Long-term use may cause the charge reserve to run short, which results in the generation of a large amount of hydrogen gas or the like from the negative electrode, elevating the internal pressure in the battery in for example a fully charged state. Thus, a safety valve will open to release hydrogen gas from the battery to suppress excessive rise in the internal pressure. However, the electrolyte will also be discharged as well as the hydrogen gas. A decrease in amount of the electrolyte leads to very lowering of battery characteristics. The nickel-metal hydride storage battery having the metal case has problems as above with the lowering of battery characteristics resulting from long-term corrosion of the hydrogen absorbing alloy. In the case where such battery is used as a power source of an electric vehicle or hybrid electric vehicle requiring a battery life of more than ten years, the above lowering of battery characteristics would be seriously problematic.

The present invention has been made in view of the above circumstances and has an object to provide a nickel-metal hydride storage battery capable of suppressing an increase of discharge reserve of a negative electrode to thereby prevent lowering of battery characteristics.

Means for Solving the Problems

To solve the above problems, the present invention provides a nickel-metal hydride storage battery comprising: a battery main part; a case which houses the battery main part; and a safety valve device having an excessive pressure preventing function for preventing excessive rise of internal pressure in the case by discharging gas from the case when the internal pressure in the case exceeds a predetermined value, wherein the case includes a release hole formed through the case to provide communication between inside and outside of the case, the safety valve device includes a valve member sealingly covering the release hole and including a wall forming a valve internal space communicated with the release hole, and the safety valve device has, in addition to the excessive pressure preventing function, a hydrogen leakage function for allowing leakage of hydrogen gas in the case to outside of the battery even when the internal pressure in the case is the predetermined value or less.

In the nickel-metal hydride storage battery of the present invention, the safety valve device comprises the valve member that sealingly covers the release hole and includes the wall forming the valve internal space communicated with the release hole. Accordingly, the hydrogen gas generated in the case is allowed to enter the valve internal space through the release hole. This configuration can provide a larger contact area to the valve member (specifically, the wall of the valve member forming the valve internal space) with respect to the hydrogen gas having entered the valve internal space as compared with the case where a valve having no valve internal space (e.g. a valve of a solid-core cylindrical shape) is used.

Further, this safety valve device has a hydrogen leakage function for allowing the hydrogen gas generated in the case to leak out of the battery via the valve internal space even when the internal pressure in the case is the predetermined value or less. Accordingly, even where the internal pressure in the case does not excessively rise, the hydrogen gas in the case is allowed to leak out via the valve internal space of the valve member with the large contact area exposed to the hydrogen gas. This makes it possible to readily release the hydrogen gas from the case by leakage, as compared with the case where a valve member having no valve internal space (e.g. a valve member of a solid-core cylindrical shape) is used, so that an adequate leakage amount of hydrogen can be ensured.

Such safety valve device may include a safety valve device provided with for example the valve member having the wall protruding outward from the case and forming the valve internal space to allow the hydrogen gas released from the case into the valve internal space to permeate through the protruding wall of the valve member forming the valve internal space, thereby allowing the hydrogen gas to leak out of the battery. In this case, as mentioned above, the valve member has a large contact area of the wall forming the valve internal space with respect to the hydrogen gas, so that a large hydrogen permeable area can be provided. This structure can increase the amount of hydrogen allowed to permeate through the valve member, thus facilitating leakage of the hydrogen gas from the case to the outside. Consequently, an adequate leakage amount of hydrogen can be provided.

Further, the safety valve device may be shown as an example configured such that the valve member (specifically, the wall forming the valve internal space) is constituted of a plurality of components (e.g. a valve member made of a metal member and a rubber member which are integrally molded in an annular or cylindrical shape by insert molding) for leakage of hydrogen gas to the outside through between the components forming the valve internal space. Therefore the hydrogen gas released from the case into the valve internal space is allowed to appropriately leak out through between the constituent components. In particular, a combination of constituent components forming the valve internal space, a material, and the number of components may be adjusted or selected to regulate the amount of leakage of the hydrogen gas to be discharged outside through the constituent components, thereby ensuring an appropriate hydrogen leakage amount.

As above, in the nickel-metal hydride storage battery of the present invention, the safety valve device can provide an adequate hydrogen leakage amount even where the case internal pressure does not come to excessive pressure. It is therefore possible to appropriately suppress the increase of hydrogen in the battery resulting from corrosion of the hydrogen absorbing alloy of the negative electrode. Consequently, the increase of the discharge reserve of the negative electrode can be suppressed and hence the lowering of battery characteristics can be prevented.

If the safety valve device is arranged to allow the hydrogen gas to permeate through the wall of the valve member forming the valve internal space to leak out of the battery, the valve member is preferably made of e.g. hydrogen permeable rubber. In particular, in the nickel-metal hydride storage battery using the alkaline electrolyte, high alkali-resistant hydrogen permeable resin (rubber) (e.g. EPDM) is preferably used.

The nickel-metal hydride storage battery of the present invention may be arranged so that an appropriate component (e.g. a case) other than the safety valve device allows leakage of hydrogen gas as with the safety valve device. In this case, the hydrogen gas in the case is allowed to leak out of the battery through the safety valve device and the appropriate components.

Further, the battery main part is disposed in the case for carrying out the battery functions and includes for example an electrode, a separator, and electrolyte.

Further, in the above nickel-metal hydride storage battery, the case is preferably made of metal.

In the nickel-metal hydride storage battery of the present invention, the case is made of metal. The battery can therefore have an excellent cooling property to prevent excessive increase in temperature of the battery.

In the meanwhile, in a conventional nickel-metal hydride storage battery provided with a metal case, especially, it is difficult to discharge hydrogen gas from the case by allowing the hydrogen gas to permeate through the wall of the case. Consequently, the discharge reserve of a negative electrode increases and the charge reserve thereof decreases, which would cause very lowering of battery characteristics after long term use.

In the nickel-metal hydride storage battery of the present invention, on the other hand, the safety valve device has the hydrogen leakage function as mentioned above. This makes it possible to suppress the increase of the discharge reserve of the negative electrode even where the case is made of metal, thus preventing lowering of the battery characteristics.

Further, in any one of the above nickel-metal hydride storage batteries, preferably, the wall of the valve member, forming the wall, includes a hydrogen permeable part which allows the hydrogen gas of the valve internal space to leak out by hydrogen permeation.

In the nickel-metal hydride storage battery of the present invention, through the hydrogen permeable part (a portion allowing hydrogen gas to permeate therethrough) of the valve member, the hydrogen gas is allowed to appropriately leak from the valve internal space to the outside. The hydrogen permeable part may be provided in whole or part of wall forming the valve internal space (e.g. the entire wall protruding outward from the case and forming the valve internal space).

Further, in the above nickel-metal hydride storage battery, preferably, the hydrogen permeable part of the valve member includes an area increasing part having at least one of a bend and a fold for increasing an inner contact area facing to the valve internal space and an outer contact area exposed to outside air.

In the nickel-metal hydride storage battery of the present invention, the hydrogen permeable part (a portion allowing hydrogen gas to permeate therethrough) of the valve member includes the area increasing part having at least the bend or the fold for increasing the inner contact area contacting the valve internal space and the outer contact area contacting outside air. Accordingly, the above inner contact area and the outer contact area (i.e. the hydrogen permeable area) can be largely provided as compared with the case where the hydrogen permeable part has no bend or fold (e.g. a hydrogen permeable part of a flat plate shape or a closed-end cylindrical shape). This makes it possible to further increase the amount of hydrogen allowed to permeate through the valve member, allowing the hydrogen gas in the case to readily leak out. In the safety valve device, consequently, an appropriate hydrogen leakage amount can be ensured, thereby appropriately suppressing the increase in the hydrogen in the battery.

Further, in any one of the above nickel-metal hydride storage batteries, preferably, the hydrogen permeable part of the valve member includes a thin-walled portion thinner than a surrounding portion thereof.

In the nickel-metal hydride storage battery of the present invention, the hydrogen permeable part (a part allowing hydrogen gas to permeates therethrough) of the vale member includes a thin-walled portion having a thickness smaller than the portion around it. Accordingly, hydrogen is allowed to more easily permeate through the thin-walled portion as compared with the case where the protruding wall has a uniform thickness with no such thin-walled portion. This increases the amount of hydrogen allowed to permeate through the valve member. It is therefore possible to more readily allow the hydrogen gas in the case to leak out.

Further, in any one of the above nickel-metal hydride storage batteries, preferably, the valve member includes a sealing part held in close contact with a hole-surrounding portion located around the release hole of the case, the safety valve device includes a holding member which presses the sealing part of the valve member to the hole-surrounding portion of the case to hold a sealing surface of the sealing part in close contact with the hole-surrounding portion by elasticity of the sealing part itself and to hold a predetermined height of the sealing part protruding outward from the case, and the sealing part is of a shape to provide a communication passage for communicating the release hole to the outside, between the sealing surface and the hole-surrounding portion by elastic deformation of at least part of the sealing part which is caused when the internal pressure in the case exceeds the predetermined value.

In the nickel-metal hydride storage battery of the present invention, the holding member presses the sealing part of the valve member against the hole-surrounding portion of the case to hold the sealing surface of the sealing part in close contact with the hole-surrounding portion. Further, when the internal pressure in the case exceeds the predetermined value, the communication passage communicating the release hole to the outside is generated between the sealing part and the hole-surrounding portion due to elastic deformation of at least part of the sealing part. When the internal pressure in the case is the predetermined value or less, the sealing surface of the valve member can be held in close contact with the hole-surrounding portion to prevent gas in the case from being discharged outside. When the internal pressure in the case exceeds the predetermined value, on the other hand, the gas in the case is discharged through the communication passage generated by elastic deformation of at least part of the sealing part to prevent excessive increase in the internal pressure in the case.

Additionally, the sealing part is pressed with the holding member for maintaining the predetermined protruding height of the sealing part to the outside of the case. Due to the elasticity of the sealing part itself, the sealing surface is held in close contact with the hole-surrounding portion. Therefore, the number of parts or components can be reduced and a downsized safety valve device (in particular, with a reduced protruding height from the surface of the case) can be achieved, as compared with the structure using an elastic member such as a coil spring to press the sealing surface of the sealing part against the hole-surrounding portion.

The valve member may be for example a rubber molded piece. Especially the battery of the present invention is a nickel-metal hydride storage battery and therefore a rubber molded piece made of high alkali-resistant rubber (NBR, EPDM, etc.) is preferable.

Further, in any one of the above nickel-metal hydride storage batteries, preferably, the valve member includes the sealing part held in close contact with the portion of the case around the gas release hole and the wall forming the valve internal space is a protruding wall formed to protrude from the sealing part out of the case, serving as the hydrogen permeable part.

In the nickel-metal hydride storage battery of the present invention, the wall of the valve member forming the valve internal space is a protruding wall protruding from the sealing part to the outside of the case, which serves as the hydrogen permeable part. In other words, the valve member of the safety valve device includes the protruding wall that protrudes from the sealing part, thereby forming the valve internal space communicated with the release hole, and that allows the hydrogen gas in the valve internal space to permeate through the protruding wall itself to leak out. Since the valve member is provided with such hydrogen permeable protruding wall, the valve member can have a large contact area (the hydrogen permeable area) with respect to the hydrogen gas released from the case into the valve internal space. This makes it possible to increase the amount of hydrogen allowed to permeate through the valve member, thus allowing the hydrogen gas in the case to easily leak out through the safety valve device.

Further, any one of the above nickel-metal hydride storage batteries, preferably, comprises: a cap member which covers the protruding wall, the cap member being placed in close contact with part of an outer surface of at least the protruding wall of the valve member, and wherein the cap member includes a single or plurality of through holes formed through the cap member to expose part of the outer surface of the protruding wall.

The nickel-metal hydride storage battery of the present invention includes the cap member which covers the protruding wall in close contact with at least part of the outer surface of the protruding wall of the valve member. It is accordingly possible to prevent deformation (expansion or the like) of the valve member.

Further, this cap member includes a single or plurality of through holes formed through the cap member itself to expose part of the outer surface of the protruding wall. This makes it possible to allow the hydrogen gas having permeated through the protruding wall of the valve member to appropriately leak out through the through hole(s) of the cap member. Especially, the exposed portion of the protruding wall of the valve member through the through hole of the cap member very easily allows permeation of hydrogen, resulting in smooth leakage of hydrogen to the outside.

According to the above structure, the leakage amount (the leak rate) of hydrogen gas may be controlled according to the number, size, position, etc. of the through holes of the cap member. Consequently, adjustment of the number, size, position, etc. of the through holes of the cap member can adequately suppress changes (increase and decrease) in the discharge reserve of the negative electrode, thereby preventing the lowering of battery characteristics appropriately.

Further, in the above nickel-metal hydride storage battery, preferably, the protruding wall of the valve member and the cap member are configured to provide a gap therebetween which is communicated with the through hole of the cap member.

In the nickel-metal hydride storage battery of the present invention, there is provided the gap between the protruding wall of the valve member and the cap member so that the gap is communicated with the through hole of the cap member. This configuration allows the hydrogen gas having passed through the protruding wall of the valve member to pass through the gap between the protruding wall and the cap member and then leak out through the through hole of the cap member via the gap smoothly.

Alternatively, in the above nickel-metal hydride storage battery, preferably, the wall of the valve member, forming the valve internal space, includes a hydrogen permeable part through which the hydrogen gas in the valve internal space is allowed to leak out by hydrogen permeation, the hydrogen permeable part of the valve member includes an area increasing part having at least one of a bend and a fold for increasing an inner contact area facing to the valve internal space and an outer contact area exposed to outside air, and the area increasing part and the sealing part are shaped so that the area increasing part is lower than or equal to the sealing part in comparison of outward protruding height from the case relative to the hole-surrounding portion.

According to the nickel-metal hydride storage battery of the present invention, the above inner contact area and the outer contact area (i.e., the hydrogen permeable area) can be largely provided as compared with the case where the hydrogen permeable part has no bend or fold (e.g. a flat shape). This makes it possible to further increase the amount of hydrogen allowed to permeate through the valve member, allowing the hydrogen gas in the case to readily leak out. In the safety valve device, consequently, an appropriate hydrogen leakage amount can be ensured, thereby appropriately suppressing the increase in the hydrogen in the battery. In addition, the area increasing part and the sealing part of the valve member are configured so that the height of the area increasing part is lower than or equal to the height of the sealing part in comparison of protruding height relative to the hole-surrounding portion. In other words, the valve member is formed with the area increasing part without protruding from the sealing part (without providing the protruding wall). Accordingly, the valve member can have a low protruding height from the surface (the hole-surrounding portion) of the case while holding good hydrogen permeability. This can contribute to a reduction of the protruding height of the safety valve device from the surface of the case, thus achieving a downsized battery.

Further, in any one of the above nickel-metal hydride storage batteries, preferably, the wall of the valve member, forming the valve internal space, includes two or more components, and the wall includes an interface between the components for allowing hydrogen gas to leak out from the valve internal space through between the components.

According to the nickel-metal hydride storage battery of the present invention, the hydrogen gas released from the case into the valve internal space is allowed to readily and appropriately leak out through between the constituent components forming the valve internal space. Such valve member (specifically, the wall forming the valve internal space) may be for example an integrally molded piece constituted of an annular or cylindrical, metal member and rubber member by insert molding.

Figure 1:
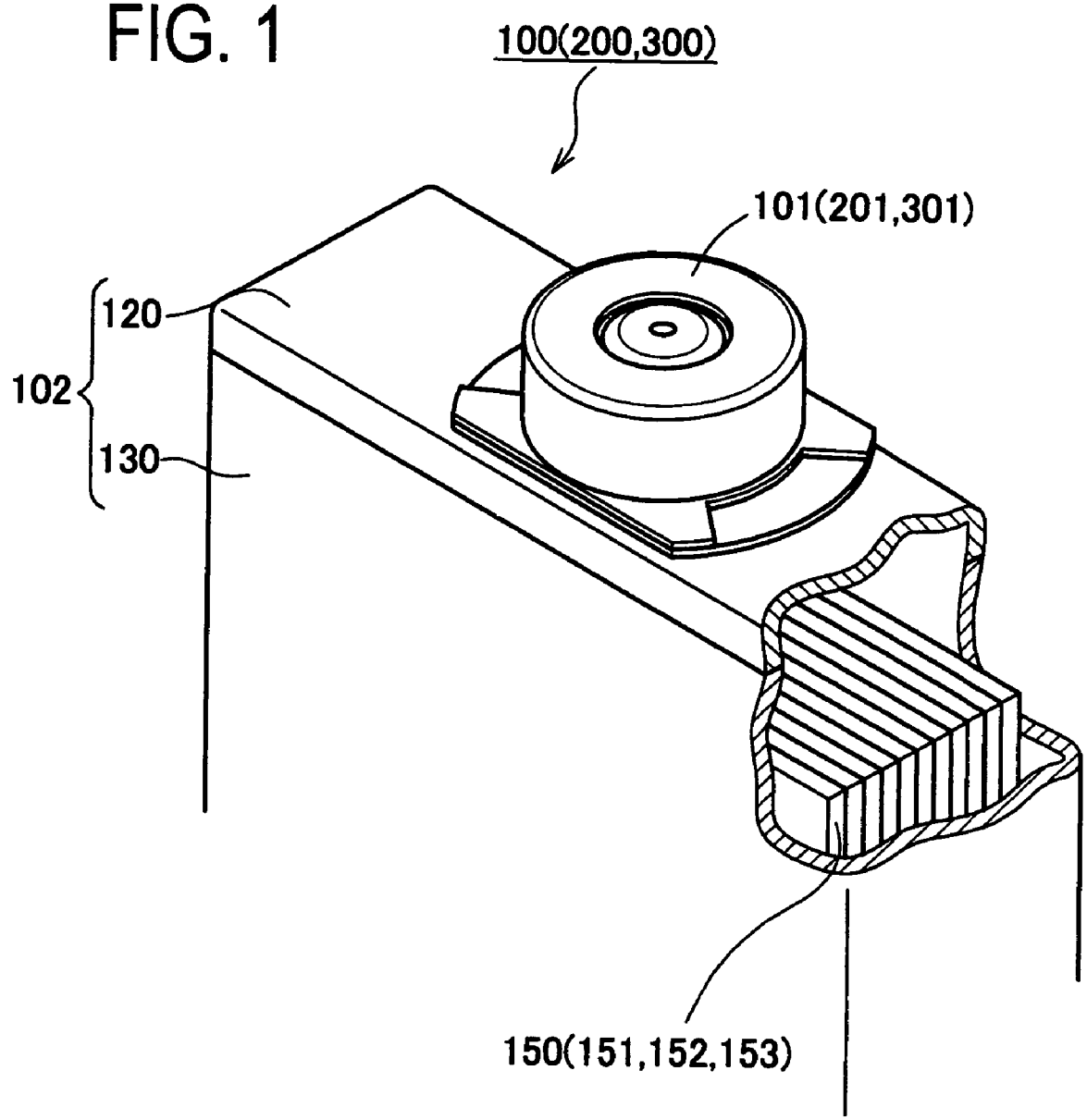
FIG. 1 is a partially cutaway perspective view of a nickel-metal hydride storage battery 100 to 300 in Embodiments 1 to 3.

EXPLANATION OF REFERENCE CODES 100, 200, 300, 600, 700, 800, 1000, 1100 Nickel-metal hydride storage battery
101, 201, 301, 601, 701, 801, 1001, 1101 Safety valve device
102, 602 Case
110, 210, 310, 410, 510, 610, 710, 810, 910, 1010, 1110 Valve member
118, 218, 318, 418, 518 Protruding wall portion (Wall forming valve internal space, Hydrogen permeable part)
120, 620 Sealing cover
121 Hole-surrounding portion
122, 622 Gas release hole
130 Battery casing
150 Battery main part
170, 270 Cap member
175, 275 Through hole
212c, 214c Thin-walled portion
312, 412 Peripheral wall (Area increasing part)
513 Area increasing part
115, 215, 315, 615, 715, 815, 915, 1015, 1115 Sealing part
718, 818, 918, 1018, 1118 Hydrogen permeable part (Wall forming valve internal space)
740, 1040 Safety valve case (Holding member)
C Valve internal space
D, E Gap
F Communication passage

BEST MODE FOR CARRYING OUT THE INVENTION

The following descriptions will be made on preferred embodiments (Embodiments 1 to 8) of the present invention, referring to accompanying drawings.

EMBODIMENT 1

A nickel-metal hydride storage battery 100 in Embodiment 1 is, as shown in FIG. 1, a rectangular sealed nickel-metal hydride storage battery including a case 102 provided with a sealing cover 120 and a battery casing 130, a safety valve device 101, and an electrode plate group 150 and an electrolyte (not shown) housed in the case 102 (the battery casing 130).

The electrode plate group 150 includes positive electrodes 151, negative electrodes 152, and bag-shaped separators 153. The positive electrodes 151 are inserted one in each bag-shaped separator 153. The positive electrodes 151 inserted in the separators 153 and the negative electrodes 152 are alternately arranged. Those positive electrodes 151 and negative electrodes 152 are collected to be connected to a positive terminal and a negative terminal respectively. Each of the nickel-metal hydride storage batteries in the embodiments (Embodiments 1 to 4) of the present invention is designed to have a positive electrode capacity of 6.5 Ah and a negative electrode capacity of 11.0 Ah. Thus, each of the nickel-metal hydride storage batteries in the embodiments (Embodiments 1 to 4) of the present invention has a battery capacity of 6.5 Ah in positive electrode regulation.

The positive electrode 151 may be formed of for example an electrode plate comprising an active material containing nickel hydroxide and an active material carrier such as foamed nickel. The negative electrode 152 may be formed of for example an electrode plate containing a hydride absorbing alloy as a negative electrode constituting material. The separator 153 may be formed of for example non-woven fabric made of synthetic fibers subjected to a hydrophilic treatment. The electrolyte may include for example an alkaline solution having a specific gravity of 1.2 to 1.4 and containing KOH.

Figure 2:
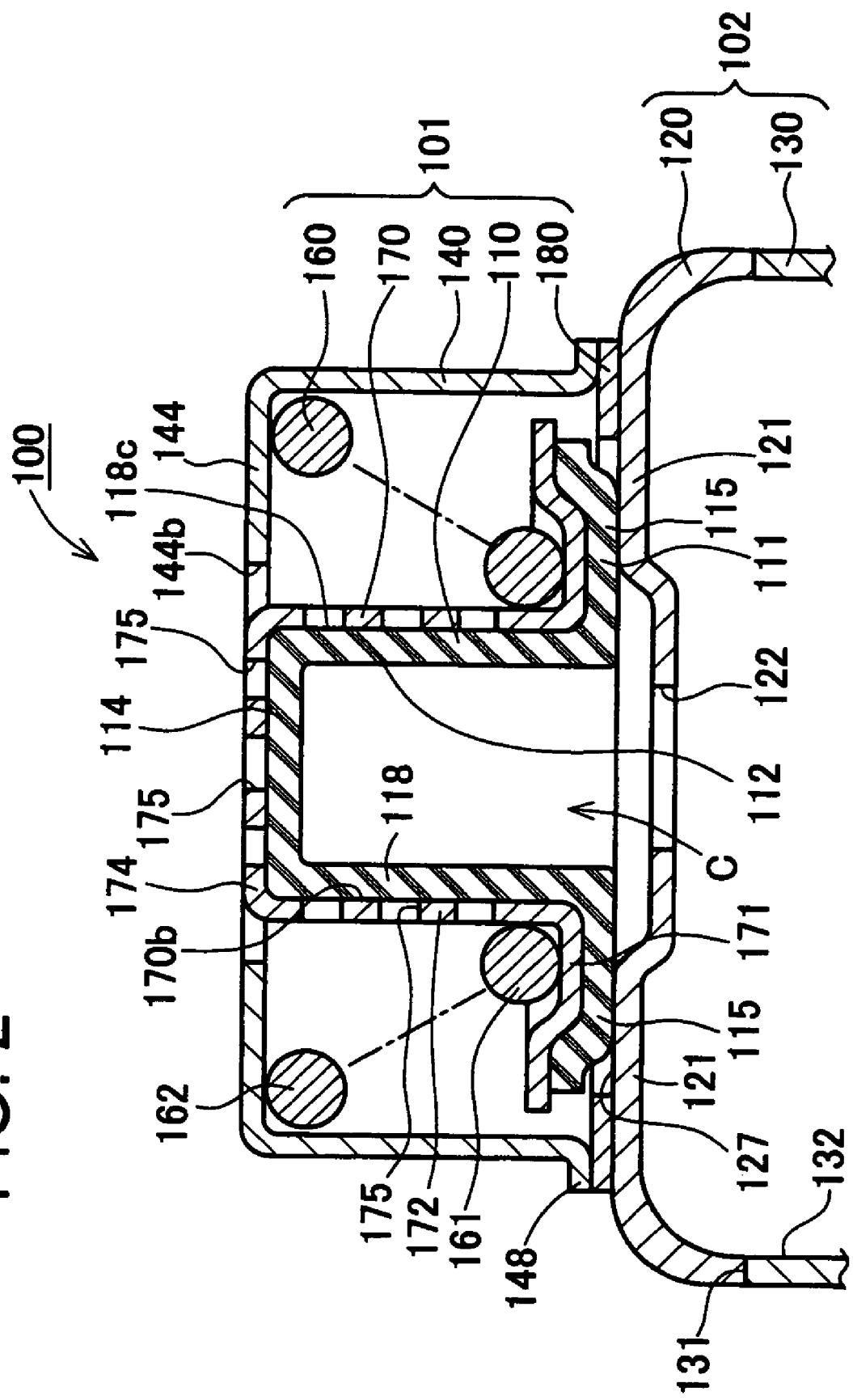
FIG. 2 is a longitudinal sectional view of a safety valve device 101 in Embodiment 1.

The battery casing 130 is made of metal (specifically, a nickel-plated steel plate) formed in a rectangular box shape. The sealing cover 120 is made of metal (specifically, a nickel-plated steel plate) formed in almost flat rectangular shape. The sealing cover 120 has a gas release hole 122 through which the inside and the outside of the case 102 are communicated as shown in FIG. 2. This sealing cover 120 is placed on an open end 131 of the battery casing 130 and welded thereto over its entire circumference, closing an opening 132 of the battery casing 130. With this configuration, the sealing cover 120 and the battery casing 130 are integrally connected with no gap therebetween to form the case 102. In Embodiment 1, the case 102 is entirely made of metal (only a metal wall), the battery can have an excellent cooling property to prevent excessive increase in temperature of the battery.

The safety valve device 101 has a valve member 110, a cap member 170, a coil spring 160, a base plate 180, and a safety valve case 140, as shown in FIG. 2. The base plate 180 is made of metal (specifically, a nickel-plated steel plate) formed in an annular flat shape, which is fixed on an outer surface 127 of the sealing cover 120. The cap member 170 is made of metal (specifically, a nickel-plated steel plate) provided with a substantially circular flange 171, a cylindrical peripheral wall 172, and a disk-shaped top wall 174. The peripheral wall 172 and the top wall 174 are formed with a number of through holes 175.

The valve member 110 is made of rubber (specifically, EPDM) and includes a substantially circular flange 111 and a protruding wall 118 (a cylindrical peripheral wall 112 and a disk-shaped top wall 114) protruding from the flange 111. The valve member 110 is of an outer shape matching an inner surface 170b of the cap member 170. This valve member 110 fitted in the cap member 170 is disposed on the outer surface 127 of the sealing cover 120 and inside the base plate 180. In Embodiment 1, the valve member 110 is formed with a wall thickness of 0.5 mm.

The safety valve case 140 is made of metal (specifically, a nickel-plated steel plate) formed in a closed-end, substantially cylindrical shape. A top wall 144 of this safety valve case 140 is formed with a through hole 144b having a larger diameter than the outer diameter of the peripheral wall 172 of the cap member 170. This safety valve case 140 is fixed on the base plate 180. The coil spring 160 is of a spiral shape having a downwardly reduced diameter in FIG. 2. This coil spring 160 is placed in a compressed state in the safety valve case 140 in such a manner that a small-diameter portion 161 is placed on the flange 171 of the cap member 170 while a large-diameter portion 162 is pressed downwardly in FIG. 2 by the top wall 144 of the safety valve case 140.

Accordingly, the flange 111 of the valve member 110 as well as the flange 171 of the cap member 170 is held down in FIG. 2 by the coil spring 160. A sealing part 115 of the flange 111 of the valve member 110 is thus held in close contact with a hole-surrounding portion 121 of the sealing cover 120 positioned around the release hole 122. In this manner, the release hole 122 can be sealingly covered by the valve member 110.

The above safety valve device 101 is arranged to release gas (hydrogen gas and the like) from the case 102 to the outside when the internal pressure in the case 102 exceeds a predetermined value to prevent excessive rise in the internal pressure in the case 102. When the internal pressure in the case 102 exceeds the predetermined value, to be more precise, the gas in the case 102 presses up the cap member 170 together with the valve member 110 in FIG. 2. This pressing force causes the coil spring 160 to be further compressed. Thus, the sealing part 115 of the valve member 110 having been held in close contact with the hole-surrounding portion 121 of the sealing cover 120 is separated from the hole-surrounding portion 121. This allows the gas in the case 102 to be released to the outside of the valve member 110 and then to the outside of the battery through the through hole 144b of the top wall 144 of the safety valve case 140. As above, the excessive rise in the internal pressure in the case 102 can be prevented.

In the safety valve device 101 in Embodiment 1, as shown in FIG. 2, the valve member 110 is formed of a thin wall made of hydrogen permeable rubber (EPDM). Accordingly, the hydrogen gas in the case 102 is allowed to enter a valve internal space C communicated with the release hole 122 and permeate through the valve member 110 to leak out of the battery through the through hole 175 of the cap member 170. Specifically, the safety valve device 101 has a hydrogen leakage function to allow the hydrogen gas in the case 102 to gradually leak out of the battery, in addition to an excessive-pressure preventing function to prevent excessive rise in the internal pressure in the case 102. Even when the internal pressure in the case 102 does not excessively rise, the above safety valve device 101 can leak the hydrogen gas from the case 102 out of the battery. This makes it possible to suppress the increase of hydrogen in the battery resulting from corrosion of the hydrogen absorbing alloy constituting the negative electrode 152. Consequently, the increase of discharge reserve of the negative electrode 152 can be suppressed and hence the lowering of battery characteristics can be prevented.

In Embodiment 1, furthermore, this valve member 110 is provided with the protruding wall 118 (the cylindrical peripheral wall 112 and the disk-shaped top wall 114) formed in a protruding shape (specifically, a closed-end cylindrical shape) protruding from the flange 111 (the sealing part 115) as shown in FIG. 2, forming the valve internal space C connected with the release hole 122. With this configuration, the valve member 110 can have a large contact area (a hydrogen permeable area) with respect to the hydrogen gas flowing from the case 102 into the valve internal space C. This makes it possible to increase the permeation amount of hydrogen allowed to permeate through the valve member 110, so that the safety valve device 101 can readily leak the hydrogen gas from the case 102 to the outside.

It is to be noted that in the nickel-metal hydride storage battery 100 in Embodiment 1 the protruding wall 118 corresponds to a wall forming the valve internal space C and also to a hydrogen permeable part.

Further, in Embodiment 1, the cap member 170 is formed with a number of through holes 175. Part of an outer surface 118c of the protruding wall 118 of the valve member 110 is held in close contact with the cap member 170 and other part of the outer surface 118c is exposed through the through holes 175 of the cap member 170. Since part of the outer surface 118c of the protruding wall 118 is held in close contact with the cap member 170, the valve member 110 (the protruding wall 118) can be prevented from becoming deformed (swollen). Further, since other part of the outer surface 118c of the protruding wall 118 is exposed through the through holes 175 of the cap member 170, the exposed part is good in hydrogen permeability and allows the hydrogen gas to permeate through such part to leak out smoothly.

By holding part of the outer surface 118c of the protruding wall 118 in close contact with the cap member 170, it is possible to prevent deformation (swelling) of the valve member 110 (the protruding wall 118). However, this deteriorates hydrogen permeability and also precludes smooth leaking of the permeated hydrogen gas to the outside. On the other hand, the exposed part of the outer surface 118c of the protruding wall 118 through the through holes 175 of the cap member 170 can be so excellent in hydrogen permeability as to leak the permeated hydrogen gas to the outside smoothly. In the safety valve device 101 in Embodiment 1, accordingly, the cap member 170 may be designed variously to have the through holes 175 in different numbers, sizes, positions, etc. to control the leakage amount (the leak rate) of hydrogen gas. Similarly, the valve member 110 may be designed variously to have different thickness, shapes, etc. to control the leakage amount (the leak rate) of the hydrogen gas. Consequently, when the number, size, position, etc. of the through holes 175 of the cap member 170 and the thickness, shape, etc. of the valve member 110 are appropriately determined, changes (increase and decrease) in the discharge reserve of the negative electrodes 152 can appropriately be suppressed and thus the lowering of battery characteristics can be prevented properly.

The nickel-metal hydride storage battery 100 in Embodiment 1 can be manufactured in the following manner.

Firstly, the positive electrodes 151 are put one in each of a plurality of bag-shaped separators 153. The plurality of separators 153 in each of which the positive electrode 151 is inserted and the plurality of negative electrodes 152 are alternately arranged to form the electrode plate group 150 (see FIG. 1). Subsequently, this electrode plate group 150 is disposed in the battery casing 130 and then the positive electrodes 151 are connected to the positive terminal not shown through lead wires and the negative electrodes 152 are connected to the negative terminal not shown through lead wires. The sealing cover 120 separately prepared is placed on the open end 131 of the battery casing 130 and welded thereto over the entire circumference, closing the opening 132 of the battery casing 130 (see FIG. 2). Accordingly, the sealing cover 120 and the battery casing 130 are assembled into the integral case 102 with no gap. Then, an alkaline aqueous solution having a specific gravity of about 1.3 is injected as an electrolyte into the case 102 through the release hole 122 of the sealing cover 120.

On the other hand, the valve element 110 is inserted in the cap member 170. The coil spring 160 is put in the safety valve case 140 so that the large-diameter portion 162 of the coil spring 160 faces the top wall 144 of the safety valve case 140. Then, the cap member 170 with the valve member 110 being fitted therein is incorporated into the safety valve case 140 so that the flange 171 of the cap member 170 is held in contact with the small-diameter portion 161 of the coil spring 160.

The base plate 180 is then fixed to the flange 148 of the safety valve case 140 by laser welding. Thus, the safety valve device 101 is produced. This safety valve device 101 is placed on the outer surface 127 of the sealing cover 120 so that the safety valve device 101 is axially aligned with the release hole 122, and the safety valve device 101 is fixed to the sealing cover 120 (the case 102) by laser welding. As above, the nickel-metal hydride storage battery 100 in Embodiment 1 can be manufactured.

EMBODIMENT 2

The following explanation will be made on a nickel-metal hydride storage battery 200 in Embodiment 2, referring to FIGS. 3 and 4. The nickel-metal hydride storage battery 200 in Embodiment 2 is different in the shapes of a valve element and a cap member from the nickel-metal hydride storage battery 100 in Embodiment 1 and similar thereto in other parts or components. A cap member 270 in Embodiment 2 is different in the number of through holes from the cap member 170 in Embodiment 1. In particular, the cap member 170 in Embodiment 1 is provided with a large number of the through holes 175 in the peripheral wall 172 and the top wall 174 (see FIG. 2). The cap member 270 in Embodiment 2 is provided with a single through hole 275 only at the center of a top wall 274 (see FIG. 3).

Figure 3:
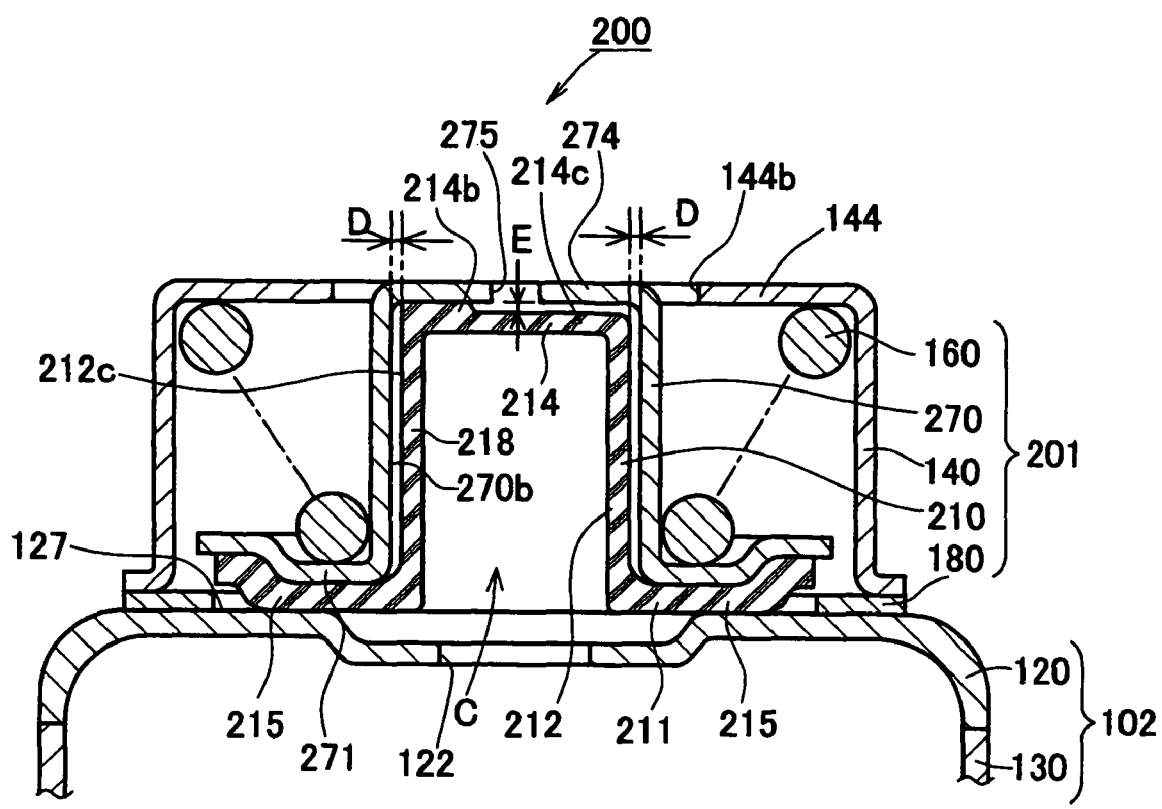
FIG. 3 is a longitudinal sectional view of the nickel-metal hydride storage battery 200 in Embodiment 2, showing a safety valve device 201 and its surroundings.
Figure 4:
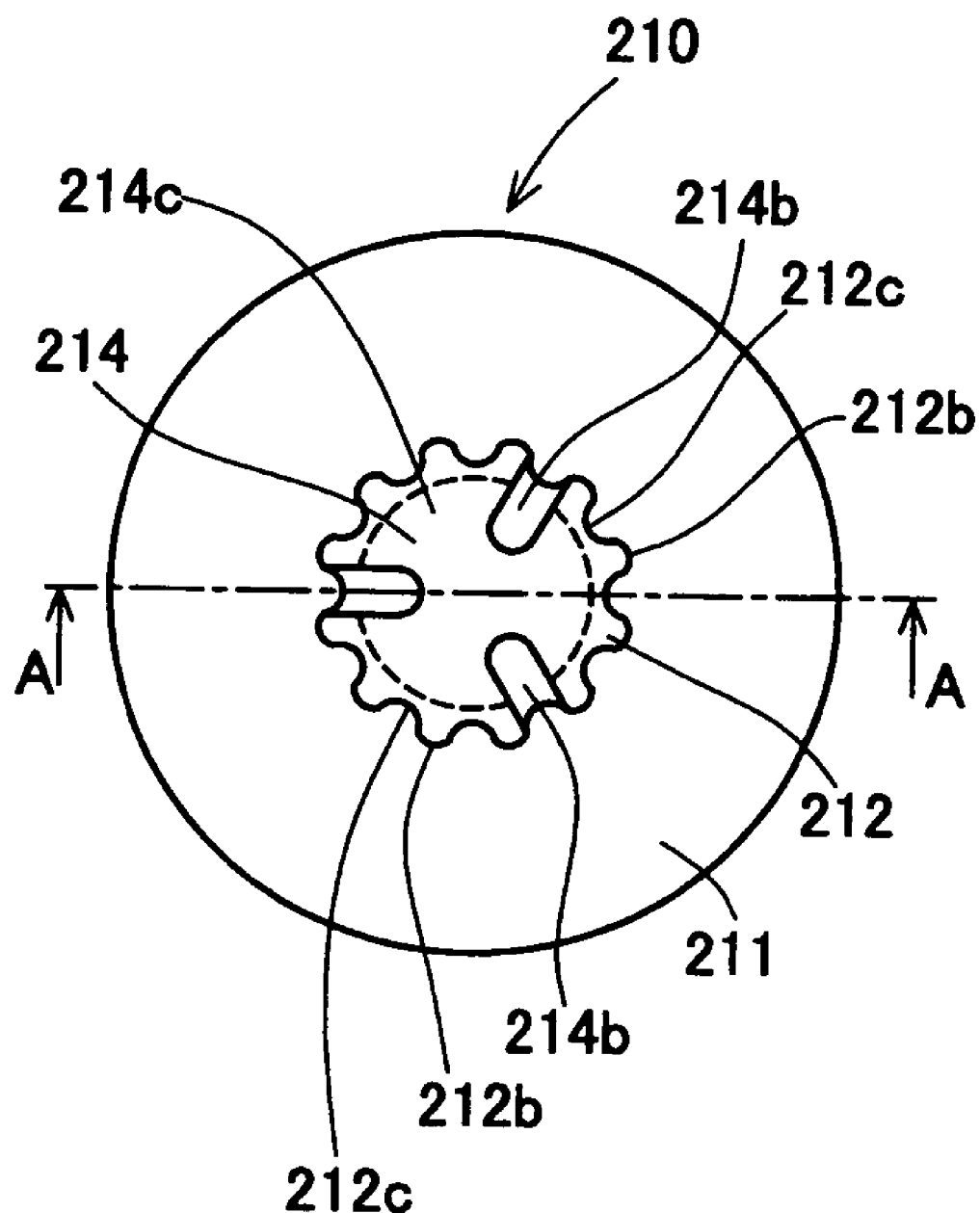
FIG. 4 is a top view of a valve member 210 in Embodiment 2.

Further, referring to FIGS. 2, 3, and 4, a valve member 210 is different in the shape of a protruding wall 218 (a peripheral wall 212 and a top wall 214) from the valve member 110 in Embodiment 1. Although the peripheral wall of the valve member 110 in Embodiment 1 is formed in a cylindrical shape having a flat outer periphery, the peripheral wall 212 of the valve member 210 in Embodiment 2 has a corrugated outer periphery with a plurality of protruding portions 212b and thin-walled portions 212c which are alternately arranged in a circumferential direction as shown in FIG. 4.

On the top wall 214 of the valve member 210, three raised portions 214b are provided, circumferentially spaced at regular intervals, as shown in FIG. 4. The part of the top wall 214 other than the raised portions 214b is referred to as a thin-walled portion 214c. In this valve member 210, the thickness of the thin-walled portion 212c of the peripheral wall 212 and the thickness of the thin-walled portion 214c of the top wall 214 are 0.3 mm respectively, thinner than the thickness (0.5 mm) of the valve member 110 in Embodiment 1. Since the valve member is provided with the thin-walled portions 212c and 214c as above, the valve member allows hydrogen gas to easily permeate therethrough.

The above valve member 210 is fitted in the cap member 270 (see FIG. 3). In the meantime, the peripheral wall 212 of the valve member 210 is formed in the corrugated shape as mentioned above. The protruding portions 212b are therefore brought into contact (close contact) with an inner surface 270b of the cap member 270. Accordingly gaps D can be generated between the thin-walled portions 212c and the inner surface 270b of the cap member 270. Further, since the top wall 214 of the valve member 210 has the raised portions 214b, gaps E can be generated between the thin-walled portion 214c of the top wall 214 and the inner surface 270b of the cap member 270.

The above gaps D and E are communicated with the through hole 275 of the cap member 270 as shown in FIG. 3. This allows the hydrogen gas having permeated through the protruding wall 218 (the peripheral wall 212 and the top wall 214) of the valve member 210 to pass through the gaps D and E to smoothly leak out through the through hole 275 of the cap member 270 via the gaps D and E.

In the nickel-metal hydride storage battery 200 in Embodiment 2, the protruding wall 218 corresponds to the wall forming the valve internal space C and also to the hydrogen permeable part.

EMBODIMENT 3

Figure 5:
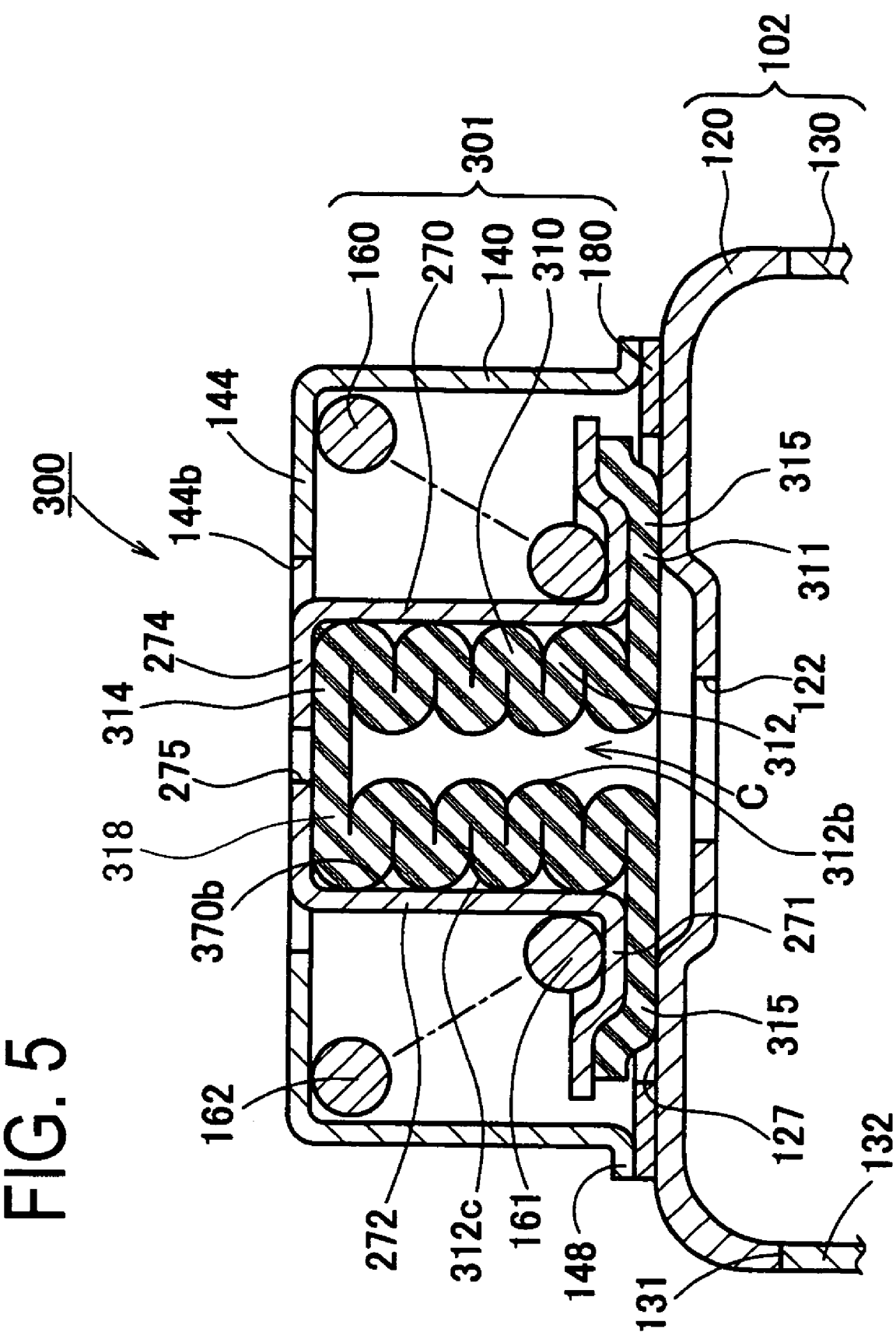
FIG. 5 is a longitudinal sectional view of a safety valve device 301 in Embodiment 3.

The following explanation will be made on a nickel-metal hydride storage battery 300 in Embodiment 3, referring to FIG. 5. This nickel-metal hydride storage battery 300 in Embodiment 3 is different in the shape of a valve member from the nickel-metal hydride storage battery 200 in Embodiment 2 and similar thereto in other parts or components.

A valve member 310 in Embodiment 3 has a peripheral wall 312 having a uniform thickness (0.5 mm) and axially folded like an accordion. Due to this accordion configuration, the peripheral wall 312 can provide an increased inner contact area facing to the valve internal space C and an increased outer contact area exposed to outside air. This makes it possible to increase the amount of hydrogen allowed to permeate through the valve member, allowing the hydrogen gas in the case 102 to easily leak out. Consequently, the safety valve device 301 can provide an adequate leakage amount of hydrogen and therefore prevent an increase in hydrogen in the battery appropriately.

In Embodiment 3, furthermore, the entire peripheral wall 312 of the valve member 310 corresponds to the area increasing part. In the nickel-metal hydride storage battery 300 in Embodiment 3, a protruding wall 318 (the peripheral wall 312 and a top wall 314) corresponds to the wall forming the valve internal space C and also to the hydrogen permeable part.

EMBODIMENT 4

The following explanation will be made on a nickel-metal hydride storage battery 600 in Embodiment 4, referring to FIGS. 6 to 10. The nickel-metal hydride storage battery 600 in Embodiment 4 is different in the structure of a safety valve device from the above Embodiments 1 to 3 and substantially similar thereto in other parts or components.

Figure 6:
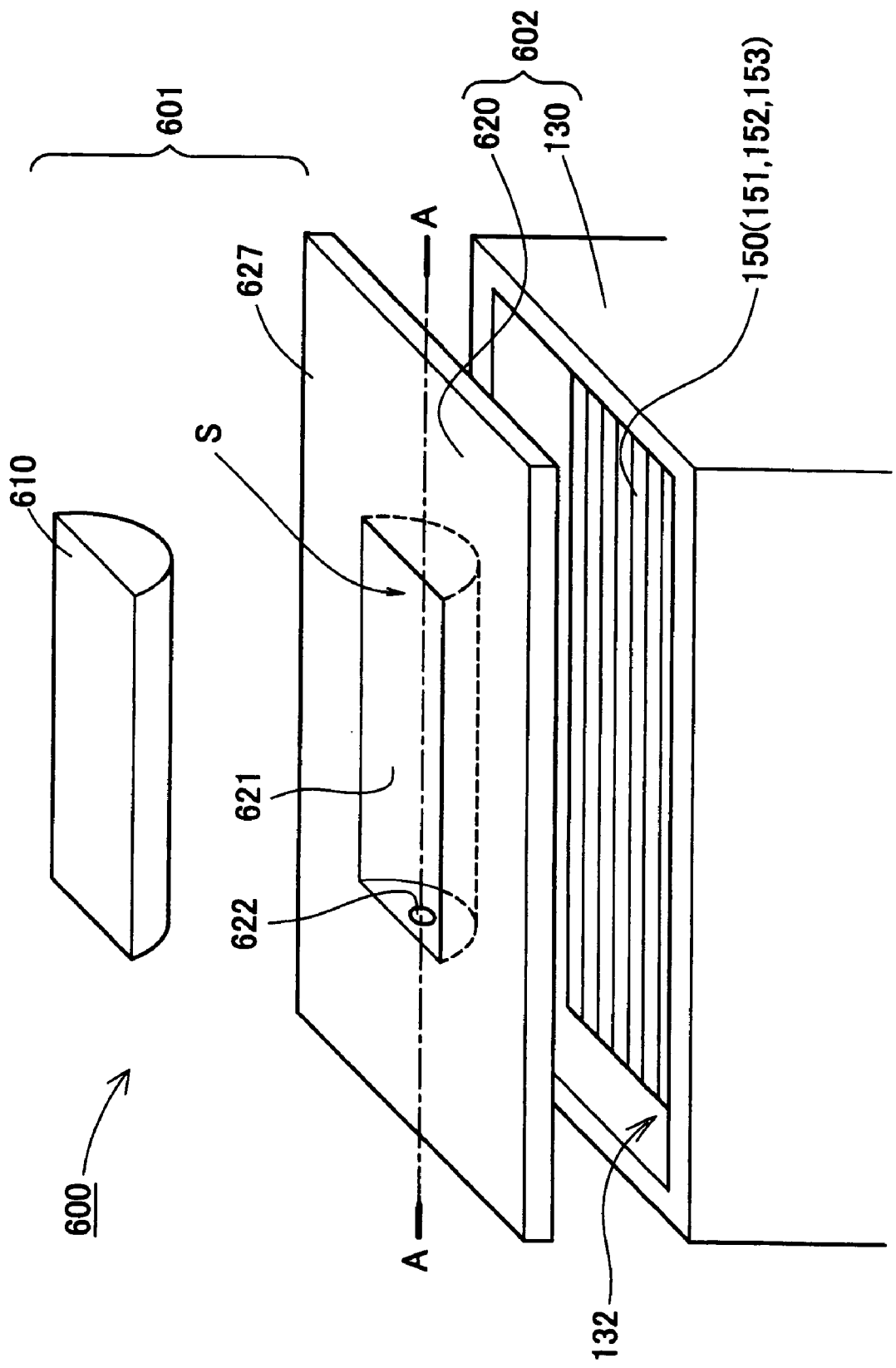
FIG. 6 is an exploded perspective view of a nickel-metal hydride storage battery 600 in Embodiment 4.

The nickel-metal hydride storage battery 600 in Embodiment 4 has a case 602 including a sealing cover 620 and a battery casing 130, a valve member 610, and a retaining plate 640 as shown in FIG. 6. The sealing cover 620 has a recessed wall 621 providing a recess S formed inwardly toward the battery casing 130 relative to an outer surface 627. This recessed wall 621 is of a substantially semi-cylindrical shape, including a recessed bottom 625 as the bottom of the recessed wall 621, a first side wall 623 connecting the recessed bottom 625 and the outer surface 627, and a second side wall 624 connecting the recessed bottom 625 and the outer surface 627 and opposite to the first side wall 623.

Figure 10:
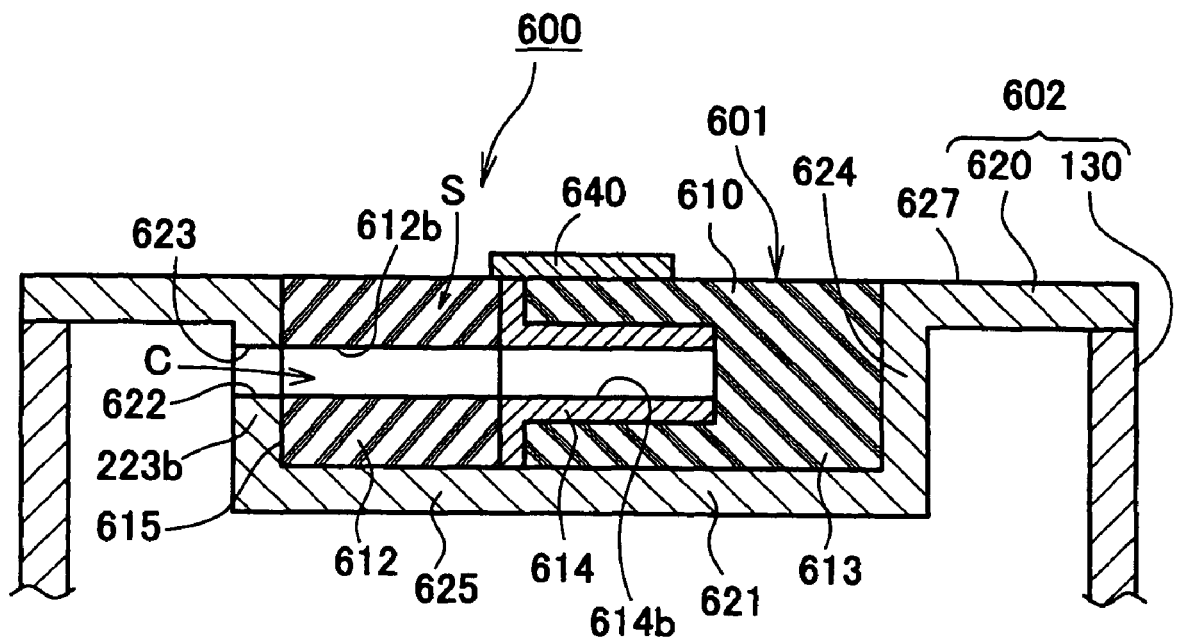
FIG. 10 is an explanatory sectional view of a safety valve device 601 in Embodiment 4, taken along a line A-A of FIG. 6.

The recessed bottom 625 is of a U-shaped (substantially semicircular) section taken along a direction perpendicular to a direction linking the first side wall 623 and the second side wall 624 (i.e. in a right-and-left direction in FIG. 10). The first side wall 623 is provided with a release hole 622 formed therethrough to communicate the inside of the case 602 to the outside thereof. The thus configured sealing cover 620 can be manufactured in such a manner that for example a metal plate of a predetermined size is press-molded to form the recessed wall 621 (the recess S) with the recessed bottom 625 having the U-shaped (almost semicircular) section, and the release hole 622 is pierced in the first side wall 623.

Figure 7:
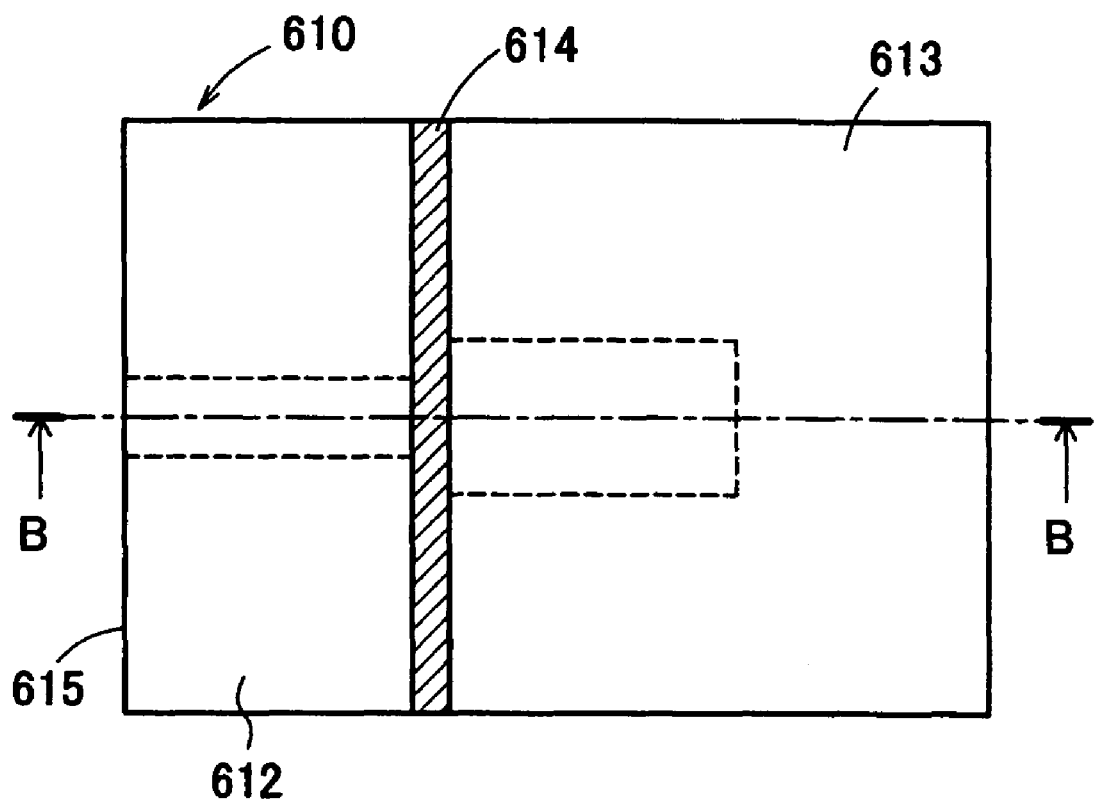
FIG. 7 is a top view of a valve member 610 in Embodiment 4.
Figure 8:
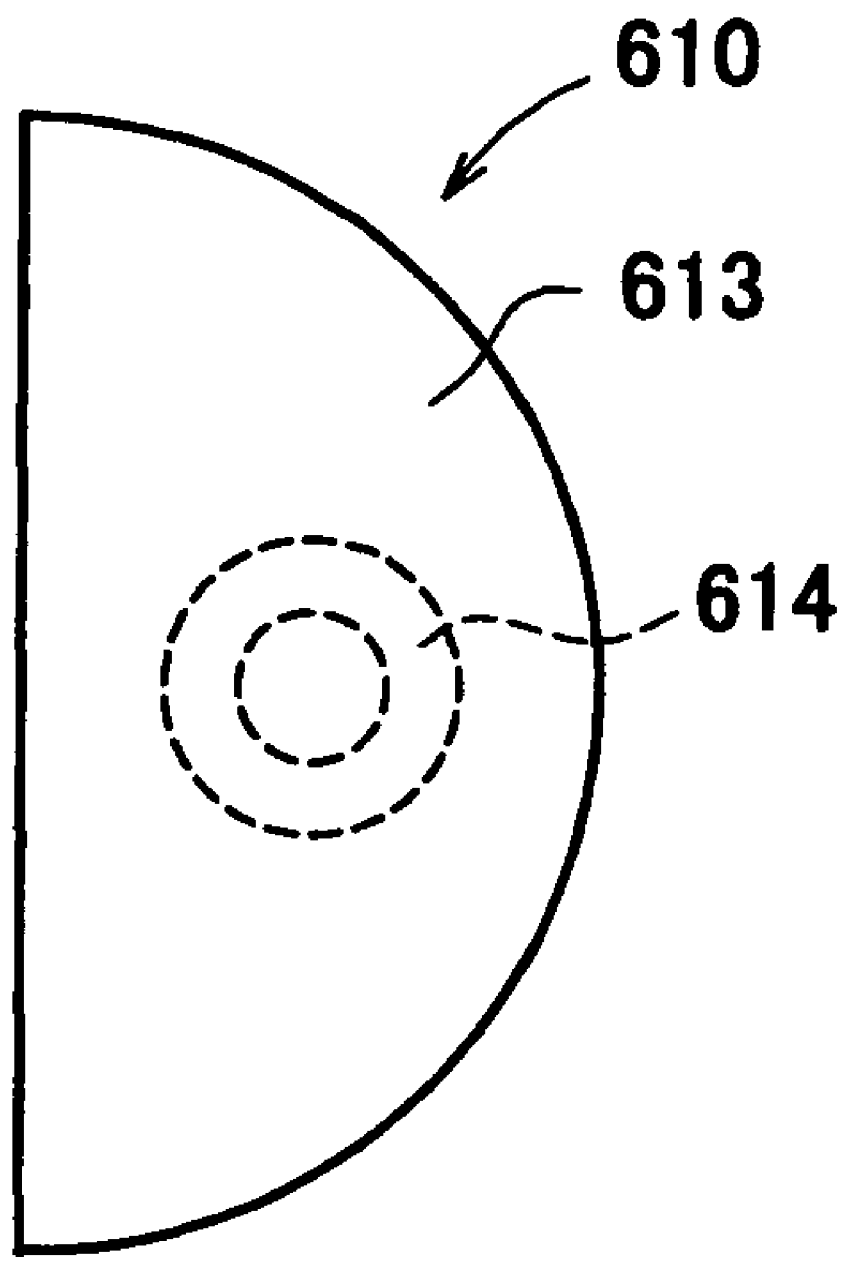
FIG. 8 is a front view of the valve member 610 in Embodiment 4.
Figure 9:
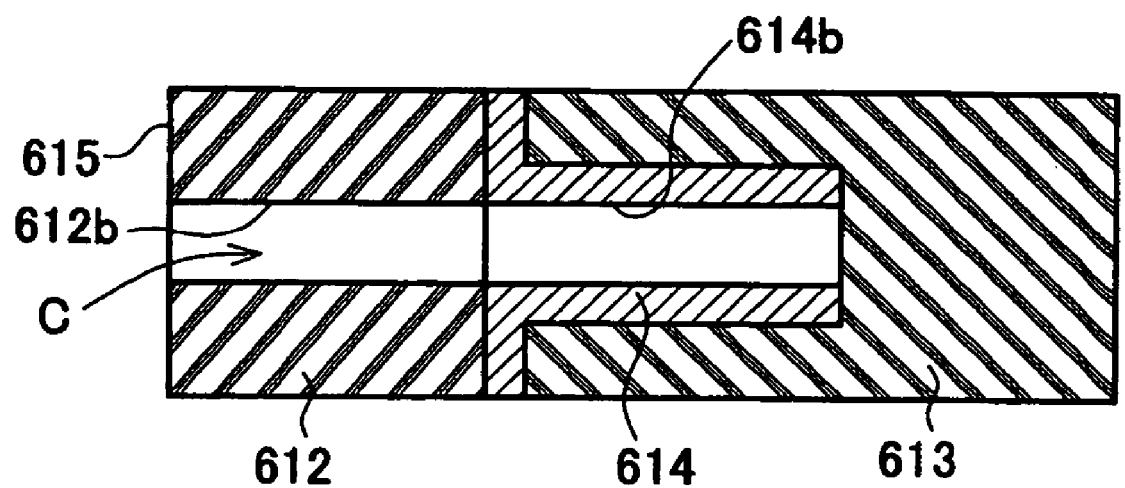
FIG. 9 is a sectional view of the valve element 610 in Embodiment 4, taken along a line B-B of FIG. 7.

As shown in FIGS. 7 to 9, the valve member 610 is an integrally molded piece including a first valve element 612 made of rubber (specifically, EPDM) formed in a semi-cylindrical shape having a first through hole 612b, a second valve element 614 made of metal (specifically, a nickel-plated steel plate) formed with a second through hole 614b, and a third valve element 613 made of rubber (specifically, EPDM) formed in a semi-cylindrical shape surrounding the second valve element 614. In other words, the valve member 610 in Embodiment 4 is a rubber molded piece formed by insert molding of the first valve element 612 and the third valve element 613 interposing the second valve element 614 therebetween.

This valve member 610 is mounted in the recess S of the sealing cover 620 as shown in FIG. 10 so that the valve member 610 is compressed in the right-and-left direction in FIG. 10. At this time, the first through hole 612b of the first valve element 612 and the second through hole 614b of the second valve element 614 form a valve internal space C communicated with the release hole 622. It is to be noted that the retaining plate 640 is fixed on (welded to) the outer surface 627 of the sealing cover 620. Accordingly, the valve member 610 can be prevented from dropping off the recess S.

In the nickel-metal hydride storage battery 600 in Embodiment 4, the valve member 610, the recessed wall 621 formed in the sealing cover 620, and the retaining plate 640 constitute a safety valve device 601. This safety valve device 601 is configured such that the valve member 610 and other parts are arranged not to protrude from the outer surface 627 of the case 602 (the sealing cover 620). Thus, a downsized battery can be achieved.

Here, a valve opening operation of the safety valve device 601 is described. When the internal pressure in the case 602 is lower than a predetermined value, the annular sealing part 615 is held in close contact with the first side wall 623 surrounding the release hole 622 while gas exists in the valve internal space C of the valve member 610. When the internal pressure in the case 602 exceeds the predetermined value, on the other hand, the rubber, third valve element 613 is pressed by the gas existing in the case 602 and the valve internal space C and elastically deformed rightwards in FIG. 10 into a compressed state. Accordingly, the second valve element 614 and the first valve element 612 are moved in a direction of separating from the first side wall 623 (i.e. in the right direction in FIG. 10), bringing the sealing part 615 out of contact with the first side wall 623, thus generating a gap between the sealing part 615 and the first side wall 623. In this state, the gas can be discharged from the case 602 appropriately.

In the meanwhile, the valve member 610 is arranged so that the rubber, first valve element 612 and the metallic, second valve element 614 are in contact with each other, while the rubber, third valve element 613 and the metallic, second valve element 614 are in contact with each other. In other words, provided between the first valve element 612 and the second valve element 614 and between the third valve element 613 and the second valve element 614 are interfaces for allowing leakage of hydrogen gas from the valve internal space C to the outside through the interfaces.

The safety valve device 601 comprising the above valve member 610 allows the hydrogen gas in the case 602 to leak out of the battery as with the safety valve devices 101 to 301 in Embodiments 1 to 3. Concretely, the hydrogen gas having flowed from the case 602 into the valve internal space C of the valve member 610 is further allowed to pass through the gaps between the rubber, first valve element 612 and the metallic, second valve element 614 and between the rubber, third valve element 613 and the metallic, second valve element 614 to leak out of the battery.

More specifically, the safety valve device 601 in Embodiment 4 can also have a hydrogen leakage function to allow the hydrogen gas in the case 602 to leak out of the battery, in addition to an excessive-pressure preventing function to prevent excessive rise in the internal pressure in the case 602. Even when the internal pressure in the case 602 does not excessively rise, the above safety valve device 601 allows the hydrogen in the case 602 to leak out of the battery. This makes it possible to suppress an increase of hydrogen in the battery resulting from corrosion of the hydrogen absorbing alloy constituting the negative electrode 152. Consequently, the increase of discharge reserve of the negative electrode 152 can be suppressed and thus the lowering of battery characteristics can be prevented.

In the nickel-metal hydride storage battery in Embodiment 4 4, the first valve element 612, second valve element 614, and third valve element 613 constitute the internal space C.

EMBODIMENT 5

The following explanation will be made on a nickel-metal hydride storage battery 700 in Embodiment 5, referring to FIGS. 14 to 17. The nickel-metal hydride storage battery 700 in Embodiment 5 is different in the structure of a safety valve device from Embodiments 1 to 3 and similar thereto in other parts or components.

Figure 14:
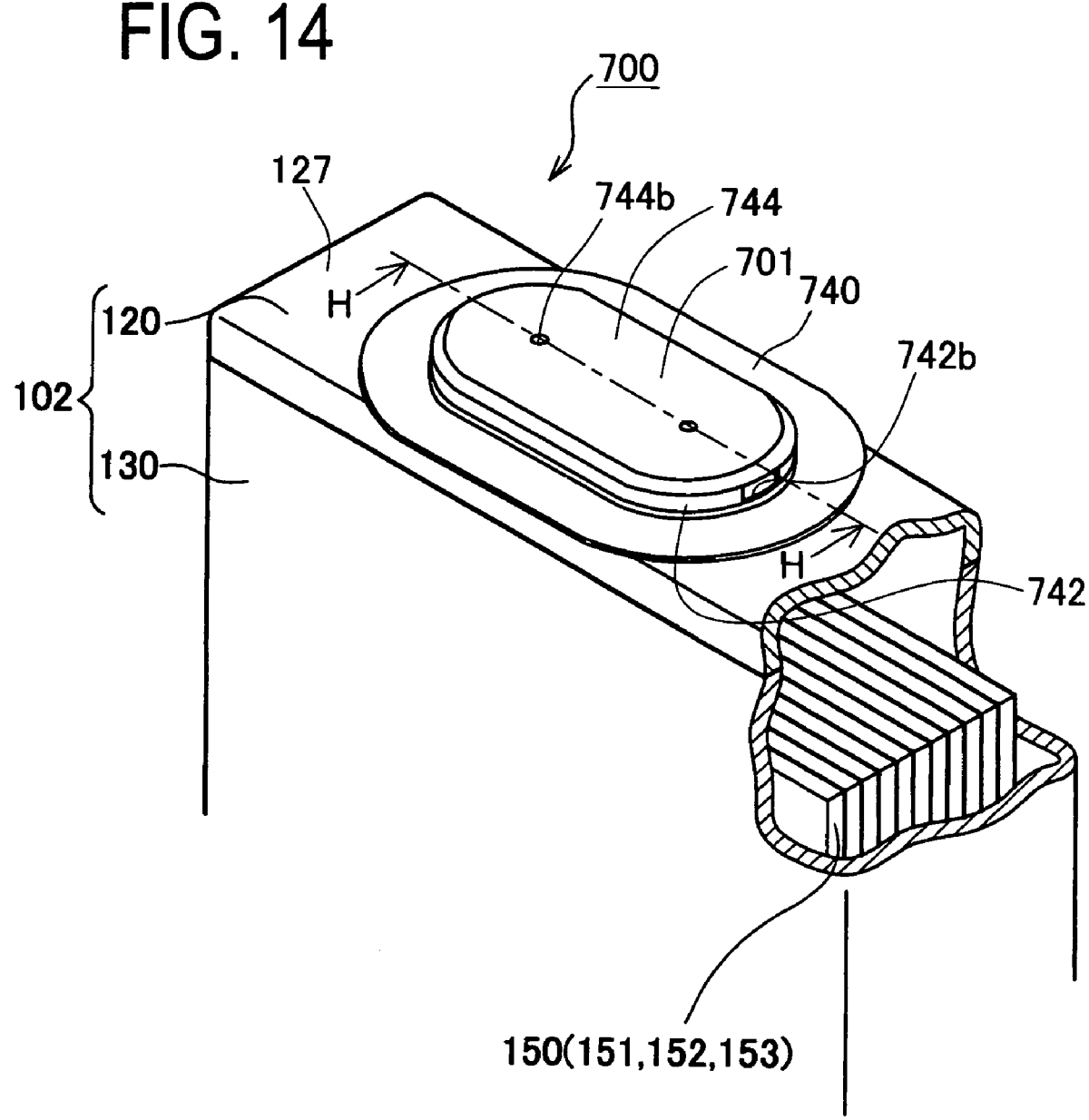
FIG. 14 is a partially cutaway perspective view of a nickel-metal hydride storage battery 700 in Embodiment 5.
Figure 15:
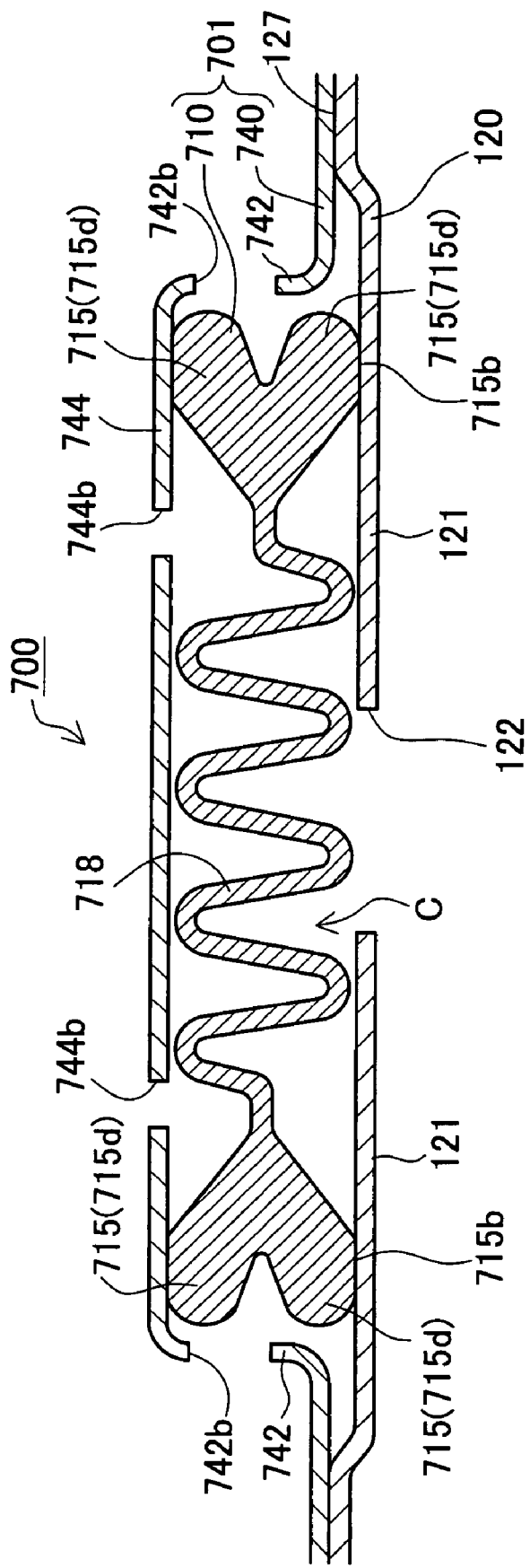
FIG. 15 is a longitudinal sectional view (in a direction perpendicular to FIG. 2) of a safety valve device 701 in Embodiment 5, take along a line H-H of FIG. 14.
Figure 16:
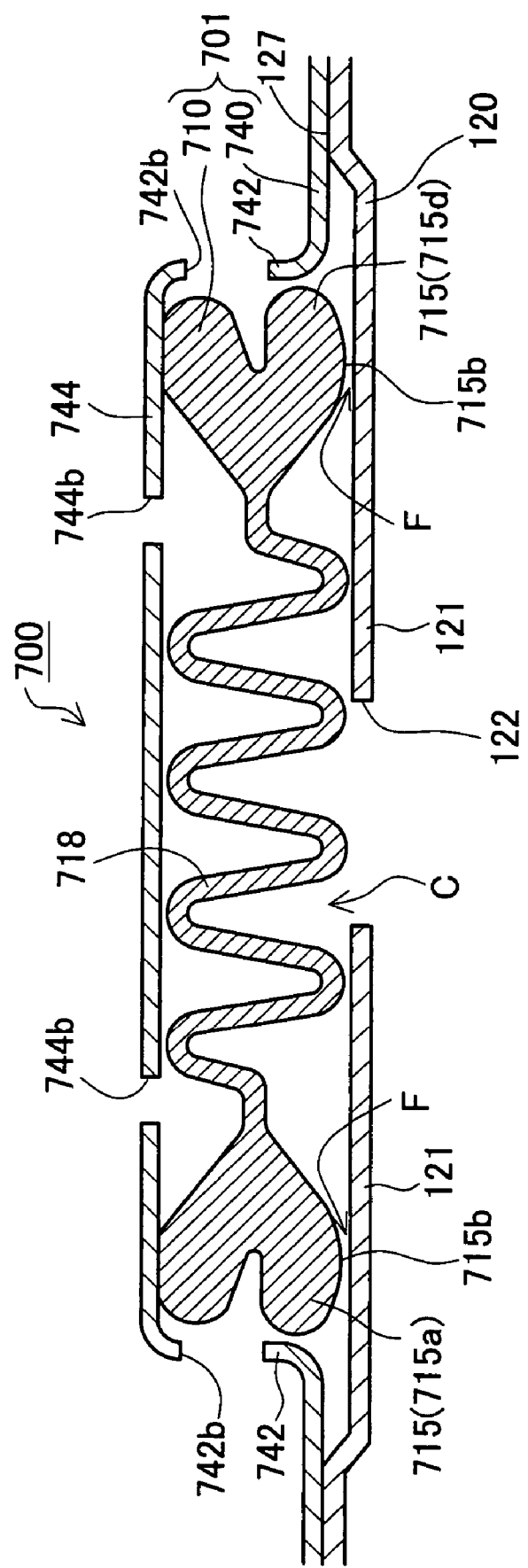
FIG. 16 is a longitudinal sectional view (taken along the line H-H of FIG. 14) of the safety valve device 701 in Embodiment 5, showing a state where the internal pressure in a case has exceeded a predetermined value.

The nickel-metal hydride storage battery 700 in Embodiment 5 specifically includes a safety valve device 701 as shown in FIG. 14. This safety valve device 701 includes a valve member 710 and a safety valve case 740 as shown in FIG. 15. The safety valve case 740 is made of metal (specifically, a nickel-plated steel plate) formed in a closed-end, substantially elliptic and cylindrical shape. A top wall 744 of this safety valve case 740 is formed with two circular through holes 744b. A peripheral wall 742 is also formed with two almost rectangular through holes 742b at opposite positions. This safety valve case 740 is fixed on the outer surface 127 of the sealing cover 120.

Figure 17:
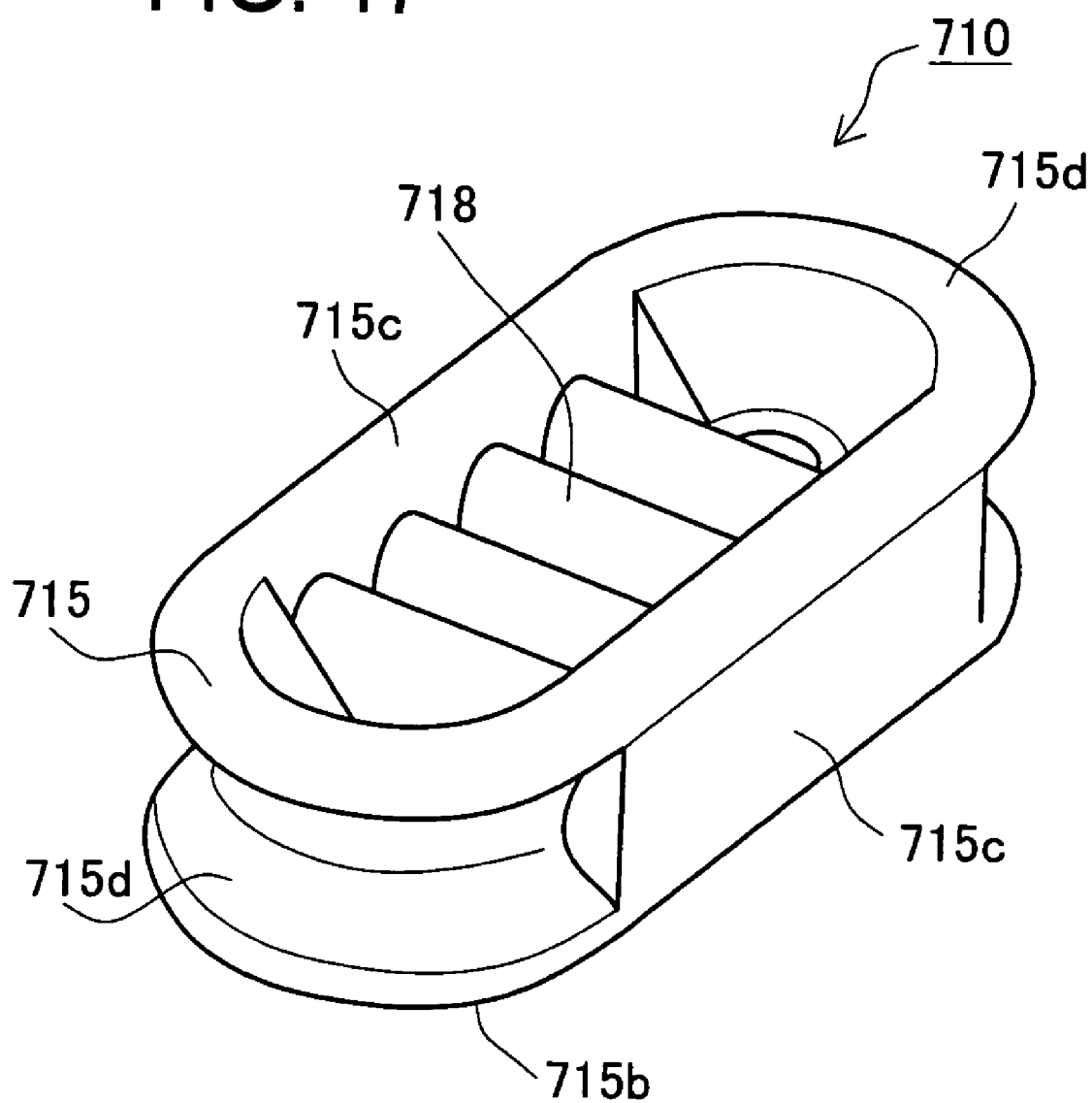
FIG. 17 is a perspective view of the valve member 710 in Embodiment 5.

The valve member 710 is made of rubber (specifically, EPDM) and includes a sealing part 715 of a substantially elliptic annular shape and a hydrogen permeable part 718 formed inside the sealing part 715 as shown in FIG. 17. The sealing part 715 is of a substantially rectangular parallelepiped shape including two parallel straight portions 715c and two curved portions 715d formed in a substantially semicircular shape joined to both ends of each of the straight portions 715c. Each curved portion 715d is recessed at its center in a height direction, showing a heart-shaped section as shown in FIG. 15.

Further, the hydrogen permeable part 718 is of a thin-walled shape folded like an accordion, extending in a direction along the surface of the sealing cover 120 (i.e., in a right-and-left direction in the figure), and concretely speaking, folded like an accordion in such a manner that the distance from the sealing cover 120 repeatedly varies as extending from one of the curved portions 715d to the other. Such valve member 710 is placed with the sealing part 715 being elastically compressed from above by the safety valve case 740 at a position to close the release hole 122 of the sealing cover 120 as shown in FIG. 15. Thus, the sealing surface 715b of the sealing part 715 is held in close contact with the hole-surrounding portion 121 around the release hole 122 of the sealing cover 120, thereby sealingly covering the release hole 122. In the nickel-metal hydride storage battery 700 in Embodiment 5, the safety valve case 740 corresponds to a holding member.

In Embodiment 5, as above, different from Embodiments 1 to 3, the hole-surrounding portion 121 is pressed through the sealing surface 715b due to the elasticity of the sealing part 715 itself so that the sealing surface 715b is held in close contact with the hole-surrounding portion 121. As is found by comparison between FIGS. 2 to 4 and FIG. 15, Embodiment 5 can eliminate the use of the coil spring 160, the cap member 170, etc., and can achieve a downsized safety valve device (in particular, a reduction in protruding height from the surface of a case) as compared with Embodiments 1 to 3.

Such safety valve device 701 is arranged to discharge gas (hydrogen gas or the like) from the case 102 when the internal pressure in the case 102 exceeds a predetermined value, to prevent the internal pressure in the case 102 from excessively rising. More specifically, when the internal pressure in the case 102 so rises as to exceed the predetermined value, the curved portions 715d, having a heart-shaped section, of the sealing part 715 of the valve member 710 are pressed upwardly by the gas in the case 102. By this pressing force, the curved portions 715d are compressed and deformed upwardly. Accordingly, a communication passage F is generated between the hole-surrounding portion 121 of the sealing cover 120 and each curved portion 715d of the sealing part 715 held in close contact with the hole-surrounding portion 121. The release hole 122 is thus communicated with the outside. Through this communication passage F, the gas in the case 102 is discharged to the outside of the valve member 710 and then to the outside of the battery through the through holes 742b of the safety valve case 740. As above, the internal pressure in the case 102 can be prevented from excessively rising.

The valve member 710 of the safety valve device 701 is further provided with the hydrogen permeable part 718 made of a thin-walled (thickness: about 0.4 mm) rubber (EPDM) material as shown in FIG. 15. Therefore the hydrogen gas in the case 102 is allowed to permeate through the hydrogen permeable part 718 from the valve internal space C communicated with the release hole 122 and then leak out of the battery through the through holes 744b of the safety valve case 740. In other wards, the safety vale device 701 allows the hydrogen gas in the case 102 to gradually leak out of the battery even when the internal pressure in the case 102 is the predetermined value or less. Even where the internal pressure in the case 102 does not rise to excessive pressure, the hydrogen gas in the case 102 is allowed to leak out of the battery through the safety valve device 701. This makes it possible to suppress the increase of hydrogen resulting from corrosion of the hydrogen absorbing alloy constituting the negative electrode 152. Consequently, the increase of the discharge reserve of the negative electrode 152 can be suppressed and thus the lowering of battery characteristics can be prevented.

In Embodiment 5, particularly, the hydrogen permeable part 718 is folded like an accordion. This hydrogen permeable part 718 can therefore have the large inner contact area facing to the valve internal space C and the large outer contact area exposed to the outside air. This makes it possible to increase the amount of hydrogen allowed to permeate through the valve member, allowing the hydrogen gas in the case 102 to easily leak out. Consequently, the safety valve device 701 can provide an adequate leakage amount of hydrogen and therefore prevent an increase of hydrogen in the battery appropriately.

In Embodiment 5, the entire hydrogen permeable part 718 of the valve member 710 corresponds to the area increasing part. Further, the hydrogen permeable part 718 and the sealing part 715 correspond to the wall forming the valve internal space C.

In the safety valve device 701 in Embodiment 5, additionally, as shown in FIG. 15, the valve member 710 is configured so that the hydrogen permeable part (the area increasing part)

718 is lower in height than the sealing part 715 relative to the hole-surrounding portion 121. In other words, differently from those in Embodiments 1 to 3, the valve member 710 is of a shape providing the hydrogen permeable part (the area increasing part) without protruding from the sealing part 715 (i.e., without forming a protruding wall). Accordingly, it is possible to provide the valve member with a lower protruding height from the surface (the hole-surrounding portion 121) of the case while having good hydrogen permeability. The safety valve device can therefore have a lower protruding height from the surface of the case as compared with those in Embodiments 1 to 3 and hence contribute to a downsized battery.

EMBODIMENT 6

Figure 18:
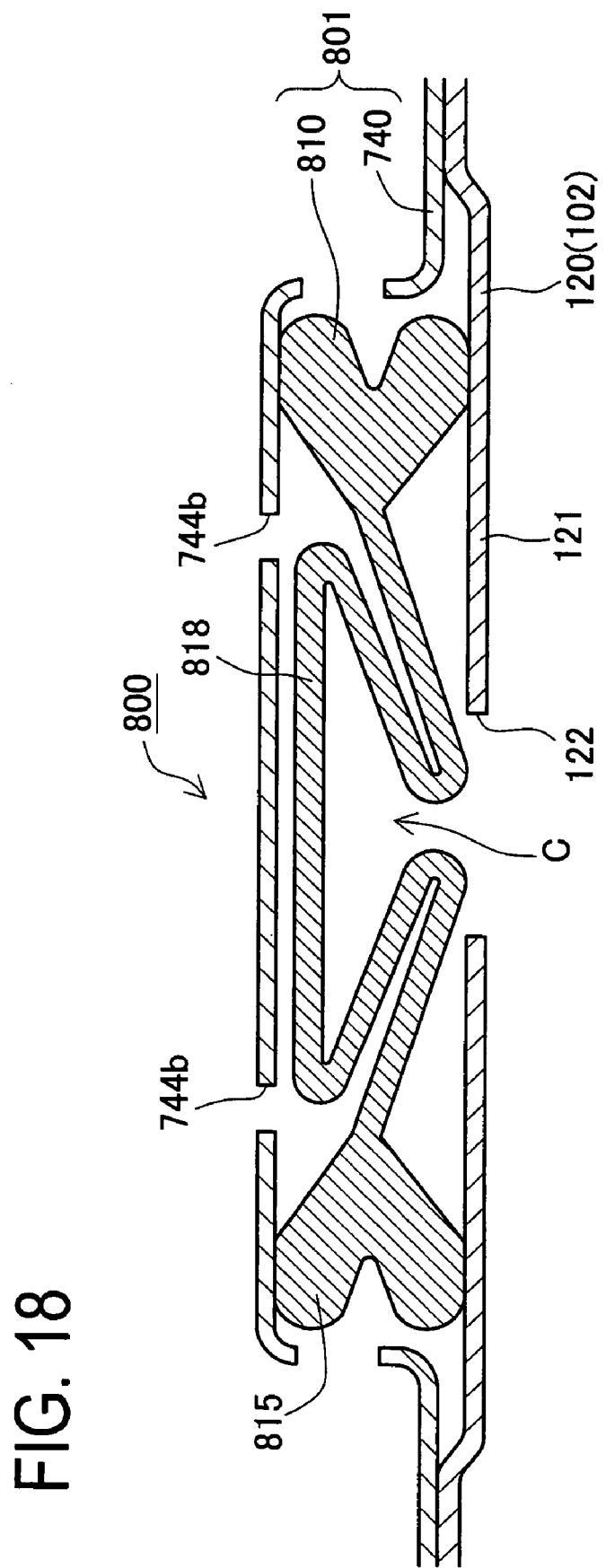
FIG. 18 is a longitudinal sectional view of a safety valve device 801 of a nickel-metal hydride storage battery 800 in Embodiment 6.

A nickel-metal hydride storage battery 800 in Embodiment 6 is different in the shape of a hydrogen permeable part of a valve member as shown in FIG. 18 from that of the nickel-metal hydride storage battery 700 in Embodiment 5 and similar thereto in other parts or components. In the valve member 710 in Embodiment 5, in particular, the hydrogen permeable part 718 is formed as shown in FIG. 15 in the folded shape like an accordion extending in the direction along the surface of the sealing cover 120 (i.e., in the right-and-left direction in the figure). The valve member 810 in Embodiment 6, on the other hand, is provided with a hydrogen permeable part 818 folded like an accordion extending in a direction perpendicular to the surface of the sealing cover 120 as shown in FIG. 18. To be more precise, the hydrogen permeable part 818 is of a shape that radially outwardly extends from the center of the valve member 810 as viewed from above, radially inwardly turns back, and further radially outwardly turns back to extend to a sealing part 815.

Such configured hydrogen permeable part 818 can also have an increased inner contact area facing to the valve internal space C and an increased outer contact area exposed to the outside air as with the hydrogen permeable part 718 in Embodiment 5. This makes it possible to increase the amount of hydrogen allowed to permeate through the valve member, allowing the hydrogen gas in the case 102 to easily leak out. Consequently, the safety valve device 801 can provide an adequate leakage amount of hydrogen and therefore prevent an increase of hydrogen in the battery appropriately.

In Embodiment 6, the entire hydrogen permeable part 818 of the valve member 810 corresponds to the area increasing part. Further, the hydrogen permeable part 818 and the sealing part 815 correspond to the wall forming the valve internal space C.

In the safety valve device 801 in Embodiment 6, additionally, as with the valve member 710 in Embodiment 5, the valve member 810 is configured so that the hydrogen permeable part (the area increasing part) 818 is lower in height than the sealing part 815 relative to the hole-surrounding portion 121. In other words, different from those in Embodiments 1 to 3, the valve member 810 is formed in a shape providing the hydrogen permeable part (the area increasing part) without protruding from the sealing part 815 (i.e., without forming a protruding wall). Accordingly, it is possible to provide the valve member with a lower protruding height from the surface (the hole-surrounding portion 121) of the case while having good hydrogen permeability. The safety valve device can therefore have a lower protruding height from the surface of the case as compared with those in Embodiments 1 to 3 and hence contribute to a downsized battery.

EMBODIMENT 7

Figure 20:
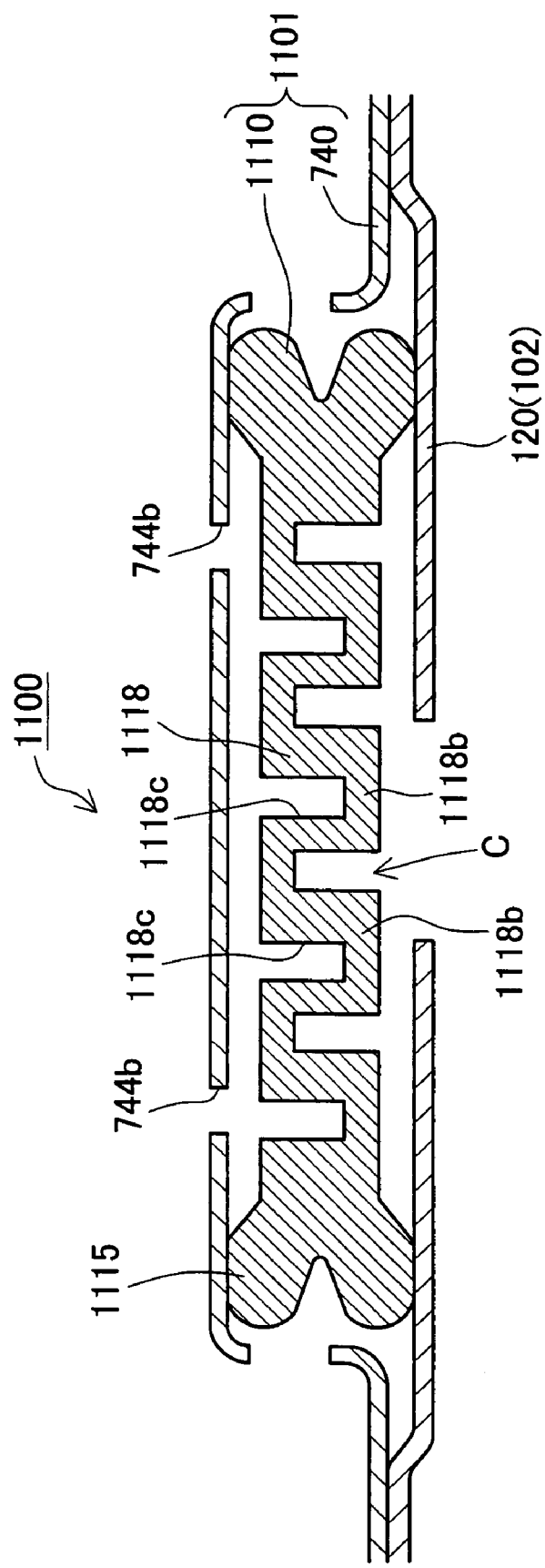
FIG. 20 is a longitudinal sectional view of a safety valve device 1101 in Embodiment 7.
Figure 21:
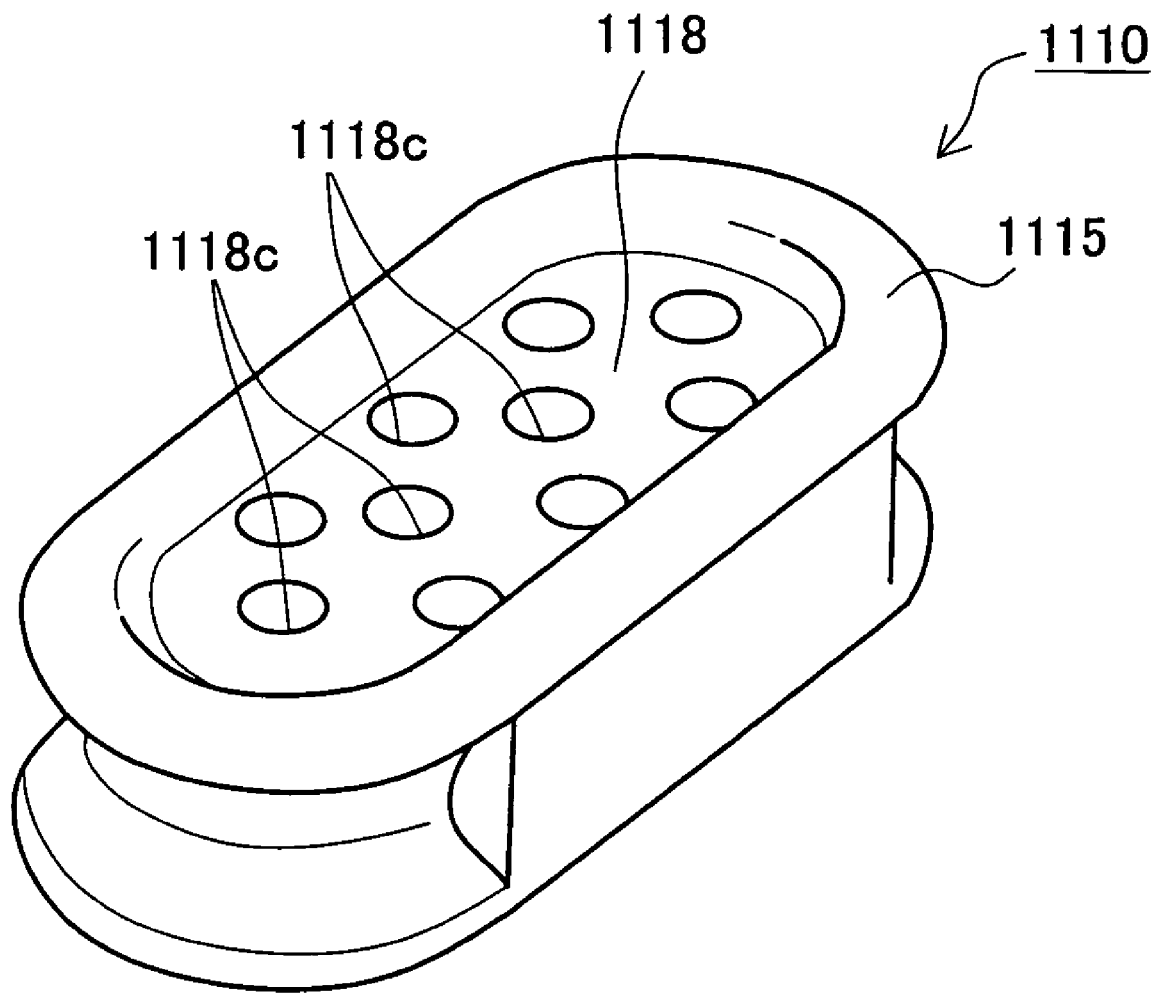
FIG. 21 is a perspective view of a valve member 1110 of the safety valve device 1101.

A nickel-metal hydride storage battery 1100 in Embodiment 7 is different in the shape of a hydrogen permeable part of a valve member as shown in FIG. 20 from the nickel-metal hydride storage battery 700 in Embodiment 5 and similar thereto in other parts or components. In the valve member 710 in Embodiment 5, in particular, the hydrogen permeable part 718 is formed as shown in FIG. 15 in the folded shape like an accordion. The valve member 1110 in Embodiment 7, on the other hand, is provided with a hydrogen permeable part 1118 including a plurality of downward protruding parts 1118b each formed in a closed-end cylindrical shape having an upper opening 1118c as shown in FIGS. 20 and 21. The hydrogen permeable part 1118 entirely has a thin-walled portion (thickness: about 0.4 mm) as with the hydrogen permeable part 718 in Embodiment 5.

Such configured hydrogen permeable part 1118 can also have an increased inner contact area facing to the valve internal space C and an increased outer contact area exposed to the outside air as with the hydrogen permeable part 718 in Embodiment 5. This makes it possible to increase the amount of hydrogen allowed to permeate through the valve member, allowing the hydrogen gas in the case 102 to easily leak out. Consequently, a safety valve device 1101 can provide an adequate leakage amount of hydrogen and therefore prevent an increase of hydrogen in the battery appropriately.

In Embodiment 7, the protruding portion 1118b of the hydrogen permeable part 1118 of the valve member 1110 corresponds to the area increasing part. Further, the hydrogen permeable part 1118 and the sealing part 1115 correspond to the wall forming the valve internal space C.

Additionally, the valve member 1110 is configured so that the hydrogen permeable part (the area increasing part) 1118 is lower in height than the sealing part 1115 relative to the hole-surrounding portion 121. In other words, the valve member 1110 is formed in a shape providing the hydrogen permeable part (the area increasing part) 1118 without protruding from the sealing part 1115 (i.e., without forming a protruding wall). Accordingly, it is possible to provide the valve member with a lower protruding height from the surface (the hole-surrounding portion 121) of the case while having good hydrogen permeability. The safety valve device can therefore have a lower protruding height from the surface of the case as compared with those in Embodiments 1 to 3 and hence contribute to a downsized battery.

EMBODIMENT 8

Figure 22:
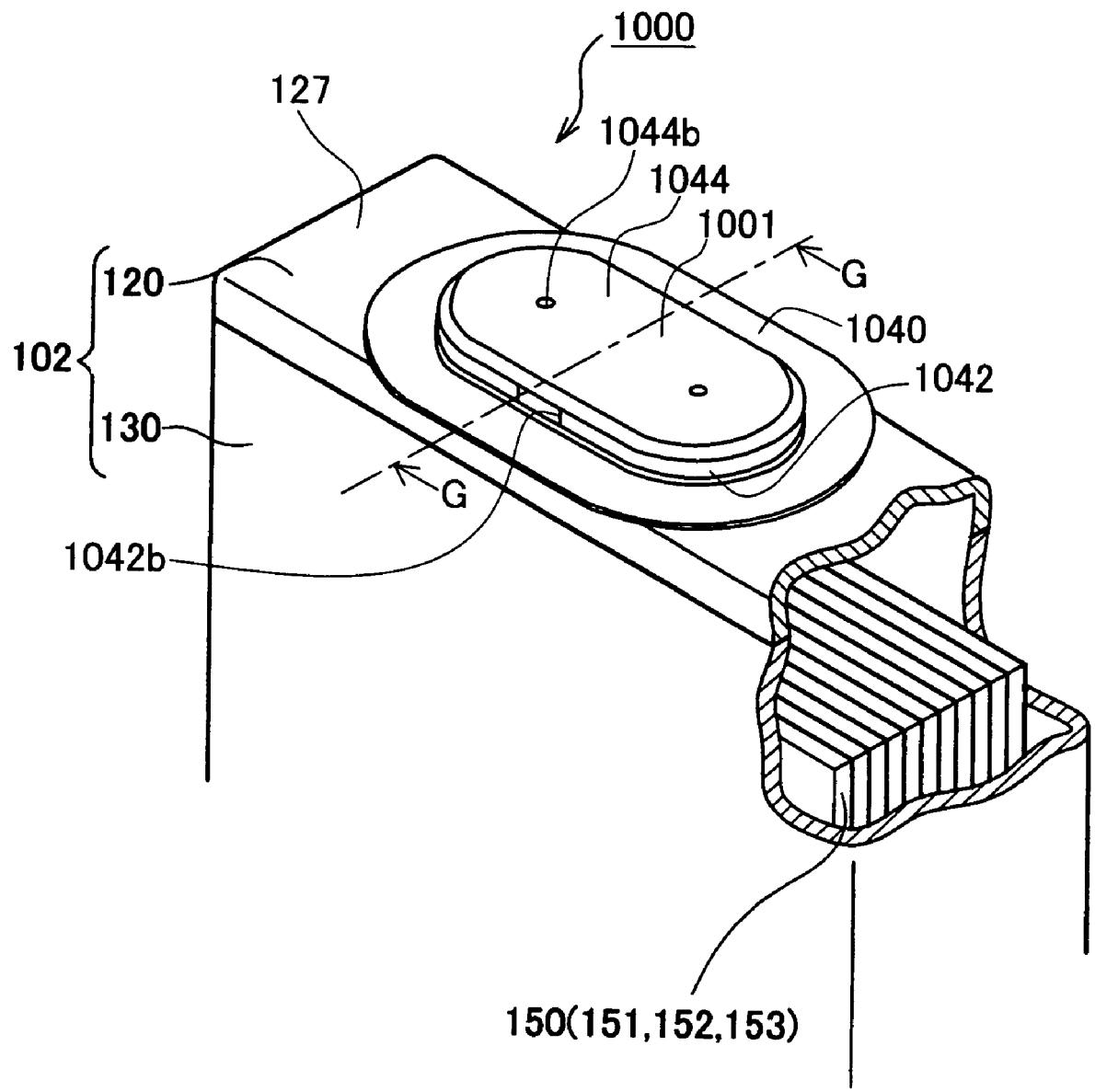
FIG. 22 is a partially cutaway perspective view of a nickel-metal hydride storage battery 1000 in Embodiment 8.

A nickel-metal hydride storage battery 1000 in Embodiment 8 is different in only a safety valve device from that of the nickel-metal hydride storage battery 700 in Embodiment 5 and similar thereto in other parts or components. Specifically, a safety valve device 1001 in Embodiment 8 includes a safety valve case 1040 as shown in FIG. 22. This safety valve case 1040 is different in only the positions of through holes formed in a peripheral wall from the safety valve case 740 in Embodiment 5 and similar thereto in other parts or components. Specifically, the safety valve case 1040 in Embodiment 8 is formed with two substantially rectangular through holes 1042b at opposite positions of a peripheral wall 742 extending in a longitudinal direction.

Figure 23:
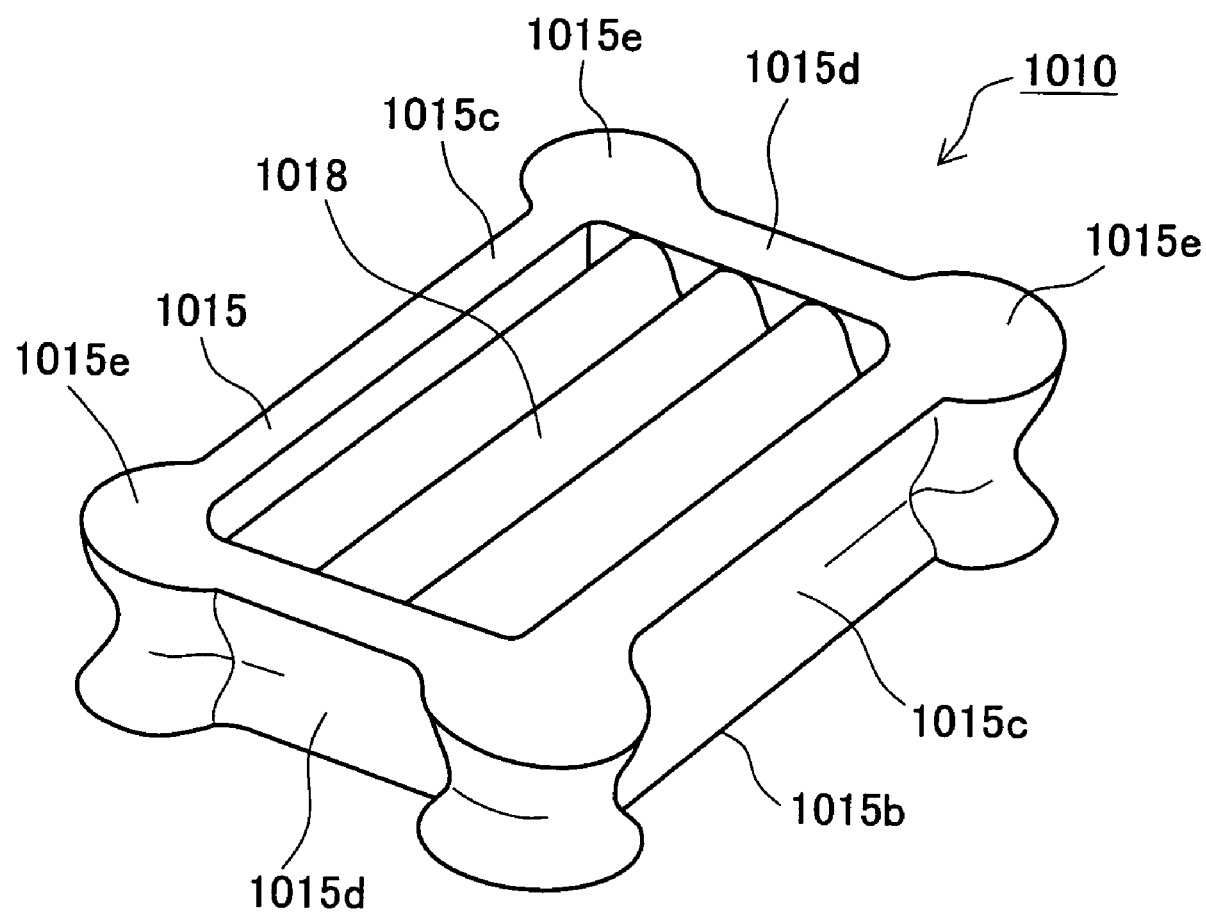
FIG. 23 is a perspective view of a valve member 1010 in Embodiment 8.

Further, as shown in FIG. 23, a valve member 1010 in Embodiment 8 is different in the shapes of a sealing part and a hydrogen permeable part from the valve member 740 (see FIG. 17) in Embodiment 5. More specifically, the valve member 1010 in Embodiment 8 includes a substantially rectangular, annular sealing part 1015 and a hydrogen permeable part 1018 located inside this sealing part 1015.

The sealing part 1015 includes a pair of first straight parallel portions 1015c of a substantially rectangular parallelepiped shape, a pair of second straight parallel portions 1015d of a substantially rectangular parallelepiped shape, and joint portions 1015e located at corners of the sealing part 1015 to join the first straight portions 1015c and the second straight portions 1015d. The joint portions 1015e have a larger thickness in a direction along a sealing surface 1015b than the first and second straight portions 1015c and 1015d. Further, the sealing part 1015 (the first straight portions 1015c, second straight portions 1015d, and joint portions 1015e) has a recess inwardly curved at the center in a height direction (in a direction perpendicular to the sealing surface 1015b), showing a substantially heart-shaped section as shown in FIG. 24.

Figure 24:
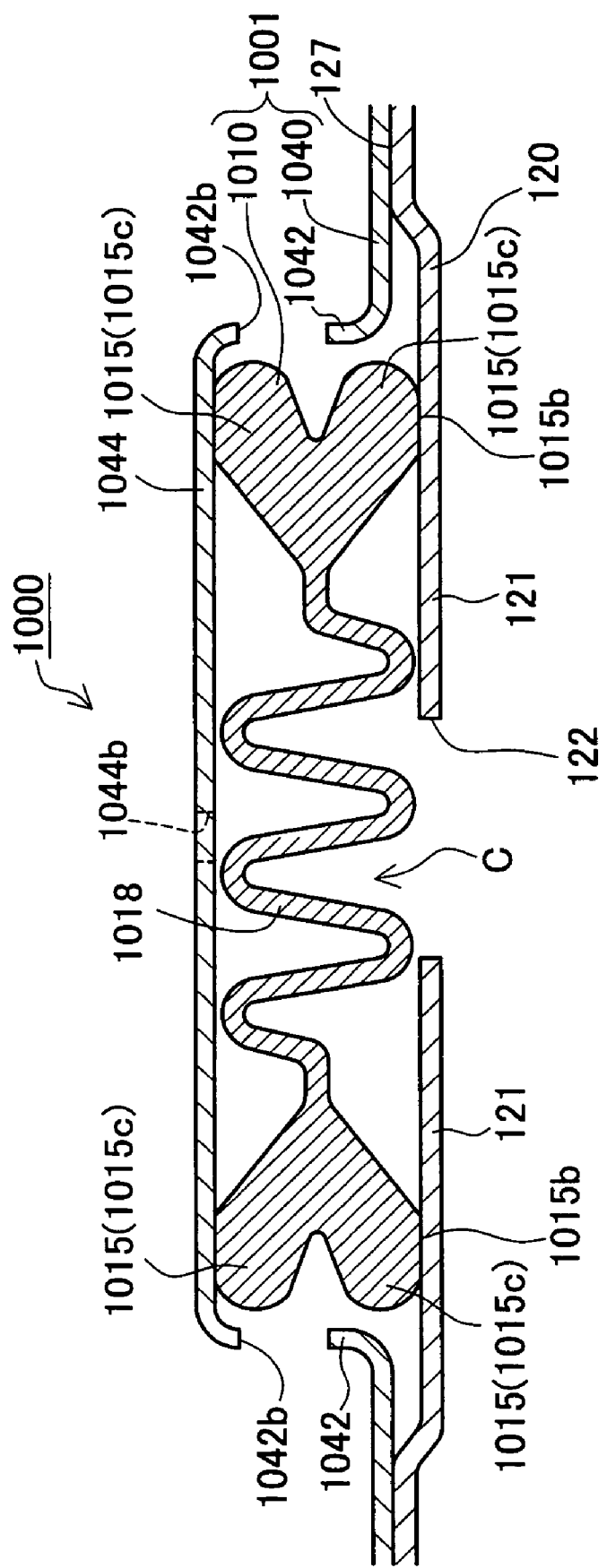
FIG. 24 is a longitudinal sectional view (in the same direction as in FIG. 2) of a safety valve device 1001 in Embodiment 8, taken along a line G-G of FIG. 22.
Figure 25:
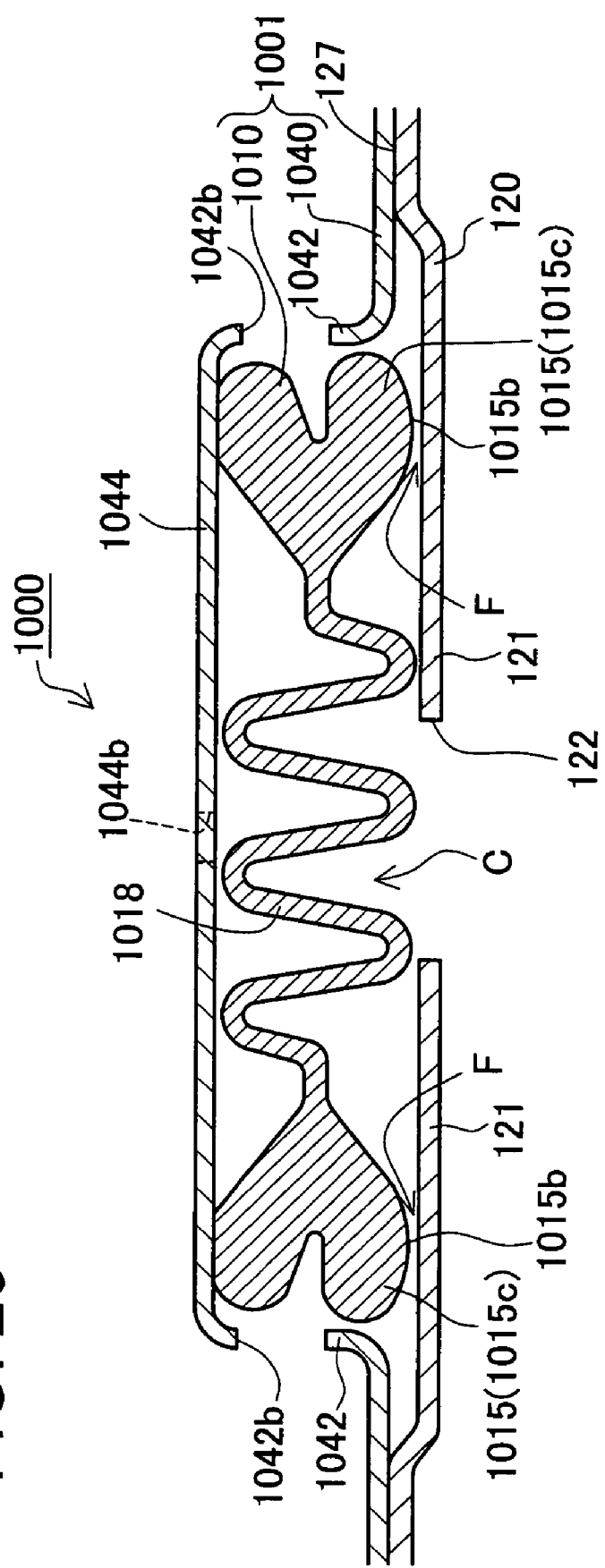
FIG. 25 is a longitudinal sectional view (taken along the line G-G of FIG. 22) of the safety valve device 1001 in Embodiment 8, showing a state where the internal pressure in a case has exceeded a predetermined value.

The hydrogen permeable part 1018 is formed as shown in FIG. 24 in a thin-walled (thickness: about 0.4 mm) and folded shape like an accordion as with the hydrogen permeable part 718 of the valve member 710 in Embodiment 5, and concretely speaking, folded like an accordion in such a manner that the distance from the sealing cover 120 repeatedly varies as extending from one of the first straight portions 1015c to the other one 1015c. Although the hydrogen permeable part in Embodiment 5 is formed in the shape folded like an accordion extending in the longitudinal direction of the valve member 710 (see FIG. 17), the hydrogen permeable part in Embodiment 8 is formed in the shape folded like an accordion extending in the short-side direction (along the second straight portions 1015d).

Such valve member 1010 is placed with the sealing part 1015 being elastically compressed from above by the safety valve case 1040 at a position to close the release hole 122 of the sealing cover 120 as shown in FIG. 24. Thus, the sealing surface 1015b of the sealing part 1015 is held in close contact with the hole-surrounding portion 121 around the release hole 122 of the sealing cover 120, thereby sealingly covering the release hole 122. Even where the valve member 1015 is used as above, the sealing surface 1015b can be held in close contact with the hole-surrounding portion 121 by the elasticity of the sealing part 1015 itself tending to press against the hole-surrounding portion 121 through the sealing surface 1015b. In the nickel-metal hydride storage battery 1000 in Embodiment 8, the safety valve case 1040 corresponds to the holding member.

When the internal pressure in the case 102 exceeds a predetermined value, the sealing part 1015 of the valve member 1010, particularly, the first straight portions 1015c having the substantially heart-shaped section is pressed upwardly by the gas in the case 102 and thus compressed and deformed upwardly. Accordingly, a communication passage F is generated between the hole-surrounding portion 121 of the sealing cover 120 and each first straight portion 1015c of the sealing part 1015 held in close contact with the hole-surrounding portion 121. The release hole 122 is thus communicated with the outside. Through this communication passage F, the gas in the case 102 is discharged to the outside of the valve member 1010 and then to the outside of the battery through the through holes 1042b of the safety valve case 1040. As above, the internal pressure in the case 102 can be prevented from rising to excessive pressure.

Even when the internal pressure in the case 102 is the predetermined value or less, the safety valve device 1001 allows the hydrogen gas in the case 102 to permeate through the hydrogen permeable part 1018 from the valve internal space C communicated with the release hole 122 and hence leak out of the battery through the through holes 1044b of the safety valve case 1040. In addition, as in Embodiment 5, the hydrogen permeable part 1018 folded like an accordion can have an increased inner contact area facing to the valve internal space C and an increased outer contact area exposed to the outside air, thus providing good hydrogen permeability. Consequently, the safety valve device 1001 can provide an adequate leakage amount of hydrogen and therefore prevent an increase of hydrogen in the battery appropriately. In Embodiment 8, the entire hydrogen permeable part 1018 of the valve member 1010 corresponds to the area increasing part. Further, the hydrogen permeable part 1018 and the sealing part 1015 correspond to the wall forming the valve internal space C.

Additionally, the valve member 1010 is arranged so that the hydrogen permeable part (the area increasing part) 1018 is lower in height than the sealing part 1015 relative to the hole-surrounding portion 121. In other words, the valve member 1010 is formed in a shape providing the hydrogen permeable part (the area increasing part) without protruding from the sealing part 1015 (i.e., without forming a protruding wall). Accordingly, it is possible to provide the valve member with a lower protruding height from the surface (the hole-surrounding portion 121) of the case while having good hydrogen permeability. The safety valve device can therefore have a lower protruding height from the surface of the case as compared with those in Embodiments 1 to 3 and hence contribute to a downsized battery.

As above, the present invention has been explained in Embodiments 1 to 8, but the present invention may be embodied in other specific forms without departing from the essential characteristics thereof.

Figure 11:
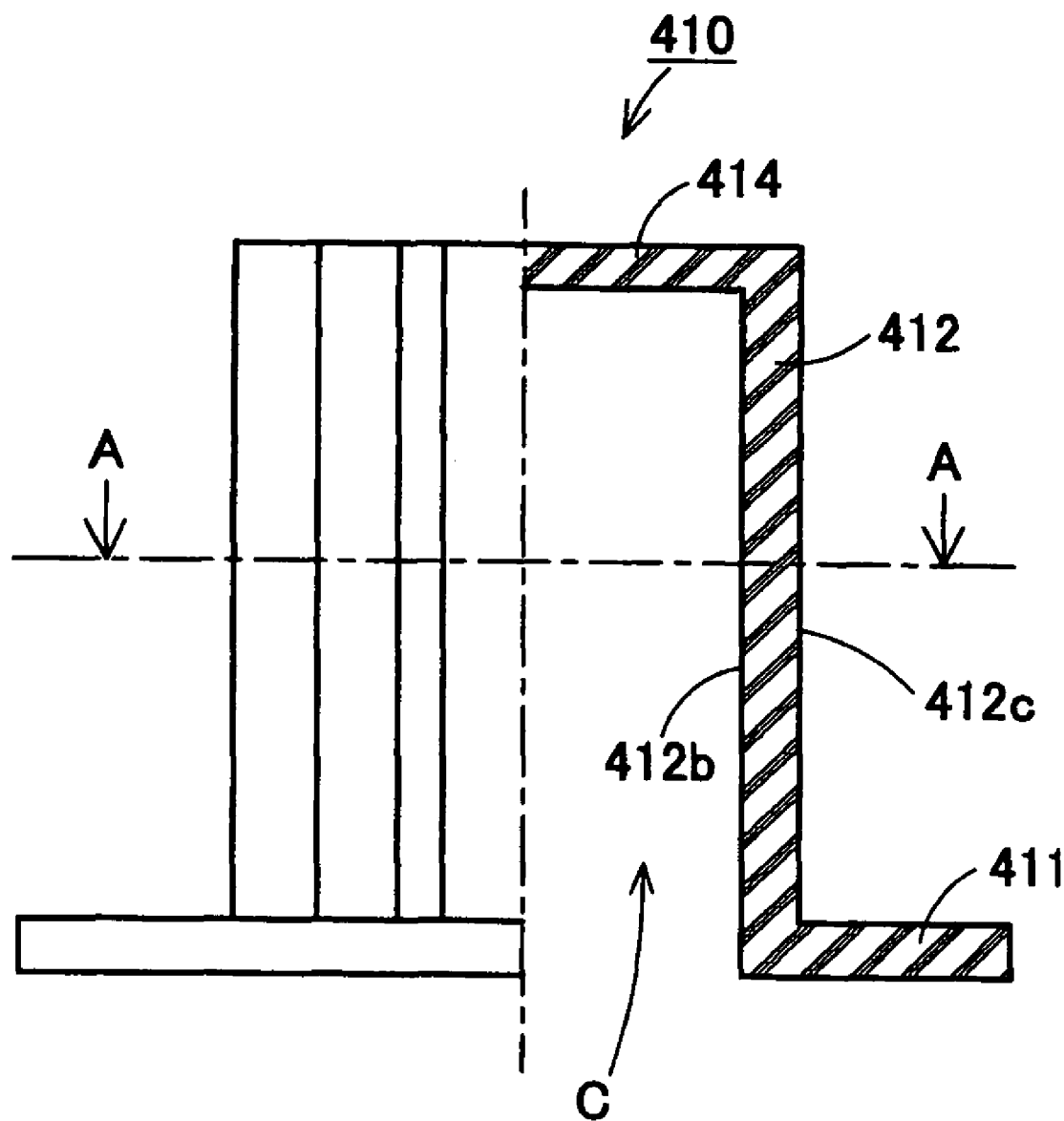
FIG. 11 is a half-sectional side view of a valve member 410 in another modification.
Figure 12:
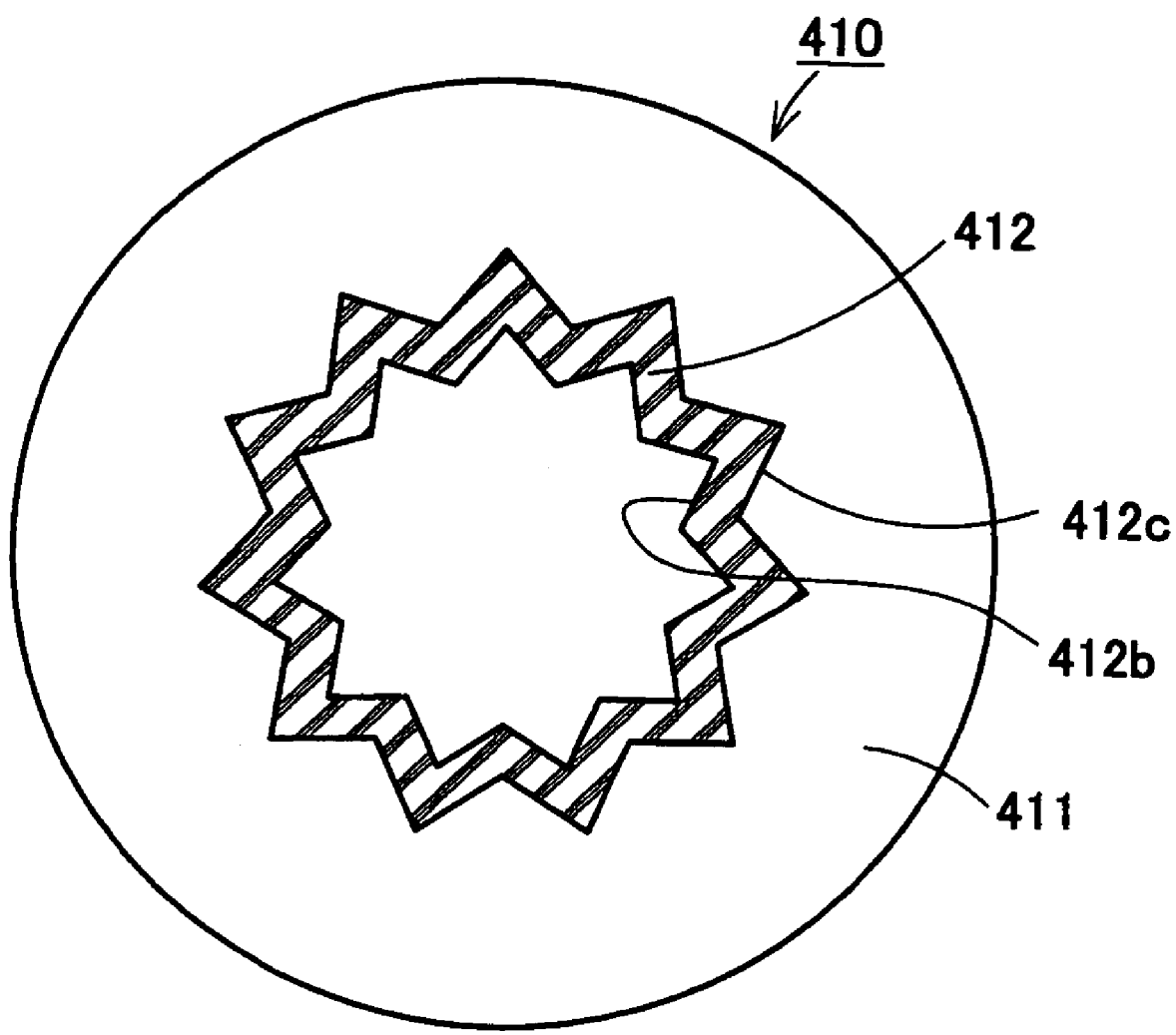
FIG. 12 is a sectional view of the valve member 410 taken along a line A-A of FIG. 11.

For instance, in Embodiment 3, the peripheral wall of the valve member 310 is folded like an accordion to increase the inner contact area facing to the internal space C and the outer contact area exposed to the outside air. Alternatively, the shape for increasing the inner contact area and the outer contact area is not limited thereto. For example, as a valve member 410 shown in FIGS. 11 and 12, a peripheral wall 412 may circumferentially be bent in zigzags. This shape can also increase the inner contact area by an inner surface 412b of the peripheral wall 412 and the outer area by an outer contact surface 412c. This makes it possible to increase the amount of hydrogen allowed to permeate through the valve member, allowing the hydrogen gas in the case 102 to easily leak out.

In this valve member 410, the entire peripheral wall 412 corresponds to the area increasing part. Further, the peripheral wall 412 and a top wall 414 correspond to the wall forming the valve internal space C and also to the hydrogen permeable part.

Figure 13:
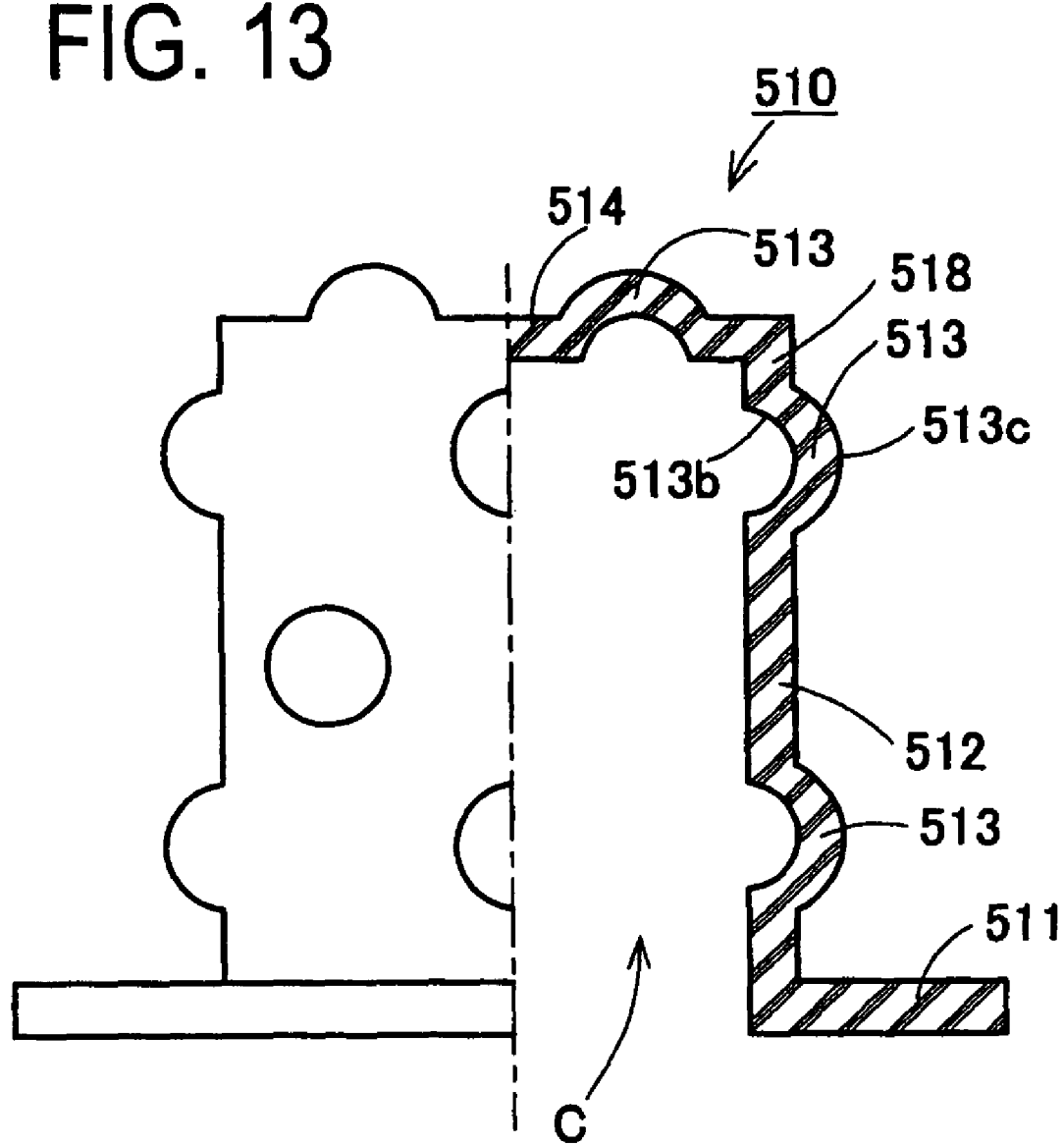
FIG. 13 is a half-sectional side view of a valve member 510 in another modification.

Alternatively, as in a valve member 510 shown in FIG. 13, a protruding wall 518 (a peripheral wall 512 and a top wall 514) may be provided with a number of projections 513 in dispersed locations. This shape can also increase the inner contact area by inner surfaces 513b of the protrusions 513 and the outer contact area by outer surfaces 513c of the projections 513. This makes it possible to increase the amount of hydrogen allowed to permeate through the valve member, allowing the hydrogen gas in the case 102 to easily leak out.

In this valve member 510, the projections 513 correspond to the area increasing part. Further, the protruding wall 518 (the peripheral wall 512 and the top wall 514) corresponds to the wall forming the valve internal space C.

Although the cases 102 and 602 are entirely made of metal in Embodiments 1 to 4, they may be made of a combination of metal and resin or only resin.

Although only the top wall 274 of the cap member 270 is formed with the through hole 275 in Embodiments 2 and 3, the peripheral wall 272 may also be formed with a through hole as in Embodiment 1. The peripheral wall 272 having the through hole enables leakage of the hydrogen gas out of the battery more readily.

Figure 19:
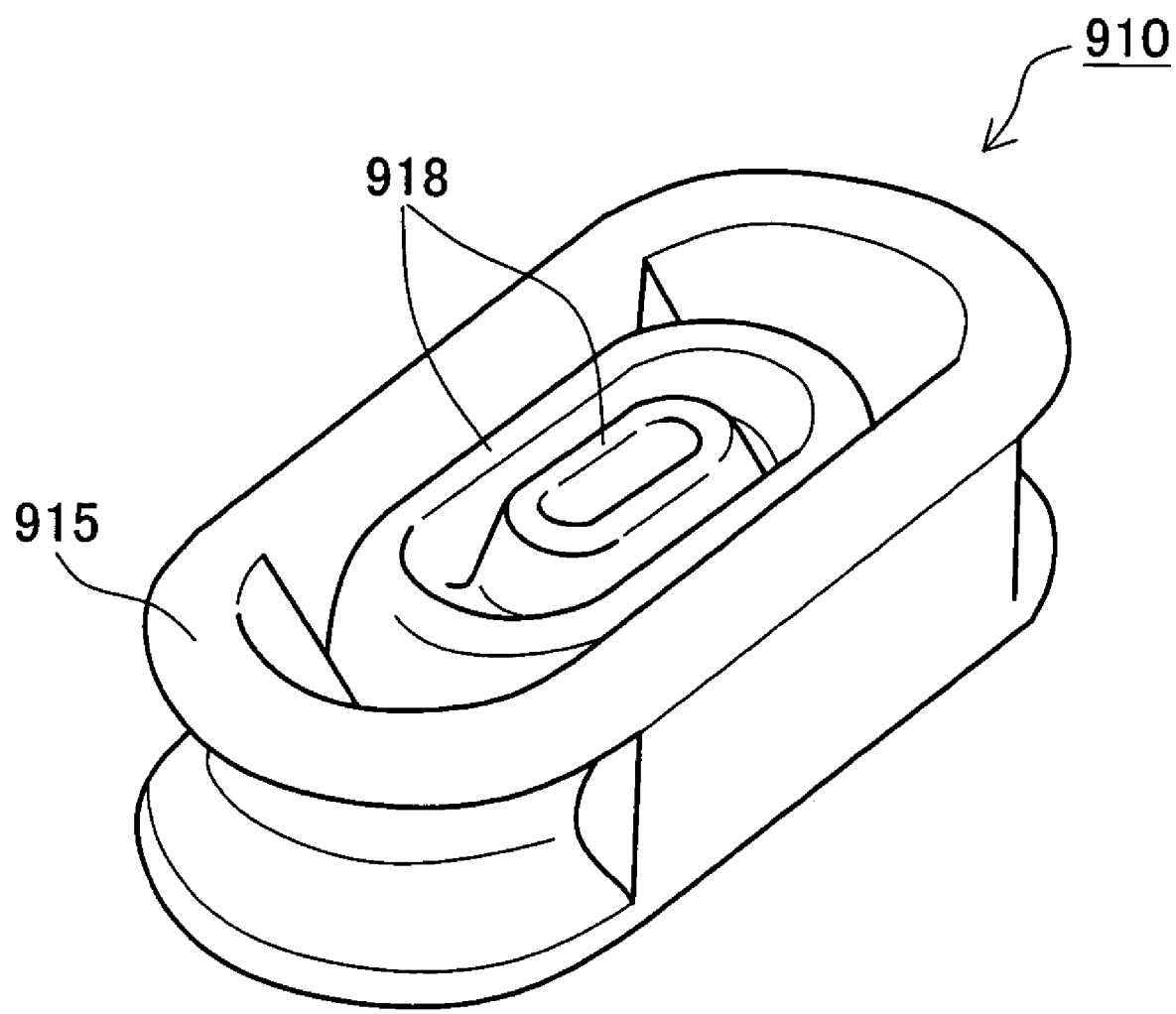
FIG. 19 is a perspective view of a valve member 910 in another modification.

In Embodiment 5, the hydrogen permeable part 718 of the valve member 710 is formed in the shape, as shown in FIG. 17, folded like an accordion extending in the direction along the straight portion 715c of the substantially elliptic annular sealing part 715 and on the inside thereof. However, this hydrogen permeable part is not limited to such shape and may be formed in a shape (a hydrogen permeable part 918) like an accordion folded in a direction toward the center of the ellipse and on the inside of a substantially elliptic annular sealing part 915 as shown in FIG. 19. This valve member 910 can also provide good hydrogen permeability and contribute to a reduced protruding height of the safety valve device.

The invention claimed is:

1. A nickel-metal hydride storage battery comprising:
a battery main part;
a case which houses the battery main part; and
a safety valve device having an excessive pressure preventing function for preventing excessive rise of internal pressure in the case by discharging gas from the case when the internal pressure in the case exceeds a predetermined value;
wherein:
the case includes a release hole formed through the case to provide communication between inside and outside of the case,
the safety valve device includes a valve member sealingly covering the release hole and including a wall forming a valve internal space communicated with the release hole,
the wall of the valve member, forming the valve internal space, includes a hydrogen permeable part, which allows hydrogen gas to leak out from the valve internal space by hydrogen permeation even when the internal pressure in the case is the predetermined value or less,
the valve member includes a sealing part held in close contact with a portion of the case around the release hole, and
the wall forming the valve internal space is a protruding wall formed to protrude from the sealing part out of the case, serving as the hydrogen permeable part.

2. The nickel-metal hydride storage battery according to claim 1, further comprising:
a cap member which covers the protruding wall, the cap member being placed in close contact with part of an outer surface of at least the protruding wall of the valve member, and
wherein the cap member includes a single or plurality of through holes formed through the cap member to expose part of the outer surface of the protruding wall.

3. The nickel-metal hydride storage battery according to claim 2, wherein
the protruding wall of the valve member and the cap member are configured to provide a gap therebetween which is communicated with the through hole of the cap member.

4. A nickel-metal hydride storage battery comprising:
a battery main part;
a case which houses the battery main part; and
a safety valve device having an excessive pressure preventing function for preventing excessive rise of internal pressure in the case by discharging gas from the case when the internal pressure in the case exceeds a predetermined value;
wherein:
the case includes a release hole formed through the case to provide communication between inside and outside of the case,
the safety valve device includes a valve member sealingly covering the release hole and including a wall forming a valve internal space communicated with the release hole,
the valve member includes a sealing part held in close contact with a hole-surrounding portion located around the release hole of the case,
the safety valve device includes a holding member which presses the sealing part of the valve member to the hole-surrounding portion of the case to hold a sealing surface of the sealing part in close contact with the hole-surrounding portion by elasticity of the sealing part itself and to hold a predetermined height of the sealing part protruding outward from the case,
the sealing part is of a shape to provide a communication passage for communicating the release hole to the outside, between the sealing surface and the hole-surrounding portion by elastic deformation of at least part of the sealing part which is caused when the internal pressure in the case exceeds the predetermined value,
the wall of the valve member, forming the valve internal space, includes a hydrogen permeable part, which allows hydrogen gas to leak out from the valve internal space by hydrogen permeation even when the internal pressure in the case is the predetermined value or less,
the hydrogen permeable part of the valve member includes an area increasing part having at least one of a bend and a fold for increasing an inner contact area facing toward the valve internal space and an outer contact area exposed to outside air, and
the area increasing part and the sealing part are shaped so that the area increasing part is lower than or equal to the sealing part in comparison of outward protruding height from the case relative to the hole-surrounding portion.

5. A nickel-metal hydride storage battery comprising:
a battery main part;
a case which houses the battery main part; and
a safety valve device having an excessive pressure preventing function for preventing excessive rise of internal pressure in the case by discharging gas from the case when the internal pressure in the case exceeds a predetermined value;
wherein:
the case includes a release hole formed through the case to provide communication between inside and outside of the case,
the safety valve device includes a valve member sealingly covering the release hole and including a wall forming a valve internal space communicated with the release hole,
the wall of the valve member, forming the valve internal space, includes two or more components, and
the wall includes an interface between the components for allowing hydrogen gas to leak out from the valve internal space through the interface even when the internal pressure in the case is the predetermined value or less.

* * * * *